(12) United States Patent
Ishigaki et al.

(10) Patent No.: US 9,438,115 B2
(45) Date of Patent: Sep. 6, 2016

(54) POWER SUPPLY SYSTEM

(75) Inventors: Masanori Ishigaki, Nagoya (JP); Shuji Tomura, Nagoya (JP); Naoki Yanagizawa, Nagakute (JP); Takaji Umeno, Nisshin (JP); Masaki Okamura, Toyota (JP); Daigo Nobe, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 83 days.

(21) Appl. No.: 14/128,797

(22) PCT Filed: Jun. 5, 2012

(86) PCT No.: PCT/JP2012/064432
§ 371 (c)(1),
(2), (4) Date: Feb. 12, 2014

(87) PCT Pub. No.: WO2013/001989
PCT Pub. Date: Jan. 3, 2013

(65) Prior Publication Data
US 2014/0145694 A1 May 29, 2014

(30) Foreign Application Priority Data

Jun. 29, 2011 (JP) .................................. 2011-144212

(51) Int. Cl.
| | |
|---|---|
| *H02M 3/158* | (2006.01) |
| *H02J 1/06* | (2006.01) |
| *B60L 15/00* | (2006.01) |
| *B60L 15/20* | (2006.01) |
| *B60L 11/18* | (2006.01) |

(52) U.S. Cl.
CPC .......... *H02M 3/158* (2013.01); *B60L 11/1803* (2013.01); *B60L 15/007* (2013.01); *B60L15/2045* (2013.01); *H02J 1/06* (2013.01); *H02M 3/1588* (2013.01); *B60L 2210/10* (2013.01); *Y02T 10/645* (2013.01); *Y02T 10/7005* (2013.01); *Y02T 10/7216* (2013.01); *Y02T 10/7283* (2013.01); *Y02T 10/92* (2013.01)

(58) Field of Classification Search
CPC ............. H02M 3/158; H02M 3/1588; H02M 2003/1586; H02M 3/1584; H02M 7/483; H02M 7/487; H02M 7/49; H02M 7/497; H02M 2007/4835
See application file for complete search history.

(56) References Cited

U.S. PATENT DOCUMENTS

| | | | |
|---|---|---|---|
| 5,142,468 A | * | 8/1992 | Nerem ............................ 363/71 |
| 2010/0071970 A1 | | 3/2010 | Welchko et al. |
| 2013/0134786 A1 | | 5/2013 | Ishigaki et al. |

FOREIGN PATENT DOCUMENTS

| | | |
|---|---|---|
| EP | 1653602 A2 | 3/2006 |
| JP | 2000-295715 | 10/2000 |
| JP | 2008-54477 | 3/2008 |
| JP | 2012-70514 | 4/2012 |

* cited by examiner

*Primary Examiner* — Fred E Finch, III
*Assistant Examiner* — Rafael O De Leon Domenech
(74) *Attorney, Agent, or Firm* — Finnegan, Henderson, Farabow, Garrett & Dunner, LLP

(57) ABSTRACT

A power source system (5) includes a direct current power source (10), a direct current power source (20), and a power converter (50) having a plurality of switching elements (S1-S4) and reactors (L1, L2). The power converter (50) performs a direct current voltage conversion between the direct current power sources (10, 20) and a power source line (PL) in parallel by controlling the switching elements (S1-S4). Each of the switching elements (S1-S4) is disposed to be included in both a power conversion path formed between the direct current power source (10) and the power source line (PL), and a power conversion path formed between the direct current power source (20) and the power source line (PL). A phase difference (φ) between a carrier signal used for a pulse width modulation control to perform the direct current voltage conversion for the direct current power source (10), and a carrier signal used for a pulse width modulation control to perform the direct current voltage conversion for the direct current power source (20) is controlled according to the operation condition of the power converter (50).

18 Claims, 25 Drawing Sheets

(a)

(b)

(a)

(b)

(a)

(b)

(a)

(b)

| | PARALLEL CONNECTION I | PARALLEL CONNECTION II |
|---|---|---|
| SG1 | /SDa or /SDb | |
| SG2 | /SDa or SDb | |
| SG3 | SDa or SDb | |
| SG4 | SDa or /SDb | |
| Dv | Db | Da |
| Di | Da | Db |
| Hv | TRANSFER FUNCTION OF FIG. 7 | TRANSFER FUNCTION OF FIG. 6 |
| Hi | TRANSFER FUNCTION OF FIG. 6 | TRANSFER FUNCTION OF FIG. 7 |
| DvFF | (Vo-V[2])/Vo | (Vo-V[1])/Vo |
| DiFF | (Vo-V[1])/Vo | (Vo-V[2])/Vo |
| Ii | I[1] | I[2] |

|   | SERIES CONNECTION |
|---|---|
| SG1 | /SDc |
| SG2 | SDc |
| SG3 | H-LOCKED |
| SG4 | SDc |
| Dv | Dc |
| Hv | TRANSFER FUNCTION OF FIG. 24 |
| DvFF | $\dfrac{\{Vo-(V[2]+V[1])\}}{Vo}$ |

FIG. 29

| MODE | CONTROL SIGNAL | SG1 | SG2 | SG3 | SG4 |
|---|---|---|---|---|---|
| PARALLEL | | /SDa or /SDb | /SDa or SDb | SDa or SDb | SDa or /SDb |
| SERIES | | /SDc | SDc | H-LOCKED | SDc |

FIG. 34

| MODE | CONTROL SIGNAL | | | |
| --- | --- | --- | --- | --- |
| | SG1 | SG2 | SG3 | SG4 |
| PARALLEL | /SDa or /SDb | /SDa or SDb | SDa or SDb | SDa or /SDb |
| SERIES | /SDa or /SDb | SDa and SDb | SDa or SDb | SDa and SDb |

POWER SUPPLY SYSTEM

CROSS-REFERENCE TO RELATED APPLICATIONS

This application is a national phase application of International Application No. PCT/JP2012/064432, filed Jun. 5, 2012, and claims the priority of Japanese Application No, 2011-144212, filed Jun. 29, 2011, the content of both of which is incorporated herein by reference.

TECHNICAL FIELD

The present invention pertains to a power source system, specifically a power source system for performing direct current power conversion between two direct current power source and a load.

BACKGROUND ART

Japanese Patent Application Publication No. 2000-295715 (JP 2000-295715 A) (Patent Document 1) describes an electric car power source system for supplying power to a load (vehicle driving motor) from two direct current power sources. In Patent Document 1, two electric double layer capacitors are utilized as direct current power sources. Patent Document 1 describes an operation mode for supplying power to the load by connecting two electric double layer capacitors in parallel.

Japanese Patent Application Publication No. 2008-54477 (JP 2008-54477 A) (Patent Document 2) describes a voltage conversion device configured to receive a plurality of direct current voltages for outputting a plurality of direct current voltages. In the power conversion device of Patent Document 2, it is possible to change an operation mode by changing over connection between terminals of an energy accumulation means (coil) and a plurality of input electric potentials and a plurality of output electric potentials. The operation mode includes a mode for supplying power to a load from two direct current power sources which are connected in parallel.

PRIOR ART DOCUMENTS

Patent Documents

Patent Document 1: JP 2000-295715 A
Patent Document 2: JP 2008-54477 A

SUMMARY OF THE INVENTION

Problem to be Solved by the Invention

The configuration of JP 2000-295715A (Patent Document 1) is provided with an electric current bidirectional boost/step-down chopper between a first battery block and a second battery block (direct current power source). It is possible to supply power simultaneously from two battery blocks by performing boost operation of the chopper. However, the power source system in Patent Document 1 can convert the output voltage of the first battery block with the chopper, not converting the output voltage of the second battery block.

JP 2008-54477A (Patent Document 2) describes the power conversion device which has an operation mode for supplying power to a common load by lowering each of output voltages of two power sources. However, direct current power conversion each from two power sources is controlled with two semiconductor switches (17 and 43 in FIG. 9) which do not have common electric current paths. A phase relationship between carrier signals for being utilized in performing PWM (Pulse Width Modulation) control of the two semiconductor switches is fixed.

In the configuration of Patent Document 1, it is not possible to provide an voltage conversion function to both of output voltages of two direct current power sources. For this reason, two direct current power sources may not be effectively utilized.

In the configuration of Patent Document 2, two semiconductor switches for lowering output voltages of the two direct current power sources do not have a common electric current path, possibly causing difficultly in reducing a switching loss of the semiconductor switch resulting from PMW control.

The present invention has been accomplished for solving such problems, and has an object to convert output voltages of each direct current power source for supplying power to the load, for the power source system provided with two direct current power sources, as well as reduce power loss resulting from direct current power conversion.

Means for Solving the Problem

In an aspect of the present invention, a power source system is provided with a first direct current power source, a second direct current power source, a power converter and a control device. The power converter is configured to perform direct current power conversion between a power source line electrically connected to a load, and first and second direct current power sources. The control device is configured to control on-off of a plurality of switching elements in accordance with pulse width modulation control so as to control an output voltage at a power source line. A plurality of switching elements included in the power converter are disposed to be included in both of a first power conversion path formed between the first direct current power source and the power source line, and a second conversion path formed between the second direct current power source and the power source line. The power converter has a first operation mode for performing direct power conversion in parallel between the first and second direct current power sources and the power source line. The control device is configured to vary a phase difference between a first carrier signal used for a first pulse width modulation control which controls a first power conversion in the first power conversion path, and a second carrier signal used for a second pulse width modulation control which controls a second power conversion in the second power conversion path, in accordance with the operation condition of the power converter in the first operation mode. In addition, the control device is configured to generate the on-off control signals of a plurality of switching elements on the basis of a first control pulse signal obtained by the first pulse width modulation control and a second control pulse signal obtained by the second pulse width modulation control. For example, the on-off control signals of the plurality of switching elements are generated on the basis of logical calculation of the first and second control pulse signals.

Preferably, the control device is configured to set variably the phase difference between the first carrier signal and the second carrier signal, based on a duty ratio of the first control pulse signal and the second control pulse signal.

More preferably, the control device is configured to set variably the phase difference between the first carrier signal and the second carrier signal, based on a combination of either one of powering and regenerative conditions in the first direct current power source and either one of powering and regenerative conditions in the second direct current power source and duty ratios of the first control pulse signal and the second control pulse signal.

Preferably, the control device is configured to set variably the phase difference between the first carrier signal and the second carrier signal so as to superimpose one of a rising edge and a falling edge of the first control pulse signal on the other of a rising edge and a falling edge of the second control pulse signal, In addition; preferably, in the first operation mode, the control device is configured to control one of the first and the second power conversion so as to control a voltage ratio of either voltage of the first and the second direct current power source to output voltage, and controls the other of the first and the second power conversion so as to control the other electric current in the first and the second direct current power sources.

More preferably, the first control pulse signal is generated on the basis of the comparison between the first carrier signal and the first control amount calculated based on one of voltage and electric current in the first direct current power source. The second control pulse signal is generated based on the comparison between the second carrier signal and the second control amount calculated based on the other of voltage and electric current in the first direct current power source.

Preferably, the power converter further includes a second operation mode for performing a direct current power conversion while the first and second direct current power sources are electrically connected in series for the power source line. In the second operation mode, the control device is configured to set variably the phase difference between the first carrier signal and the second carrier signal so as to superimpose one of rising edge and falling edge of the first control pulse signal on the other of rising edge and falling edge of the second control pulse signal. In addition, the control device is generated control signals of a plurality of switching elements, based on logical calculation of the first control pulse signal and the second control pulse.

More preferably, the control device is configured to generate a control signal of a portion of the plurality of switching elements, from the first control pulse signal and the second control pulse signal, in each of the corresponding switching element, in accordance with a logical calculation commonly utilized in both of the first operation mode and the second operation mode. In addition, the control device is configured to generate a control signal of the remaining switching element of the plurality of switching elements, from the first control pulse signal and the second control pulse signal, in each of the corresponding switching element, in accordance with logical calculation different between the first operation mode and the second operation mode, Preferably, the plurality of switching elements include first to fourth switching elements. The first switching element is electrically connected between the power source line and a first node. The second switching element is electrically connected between a second node and the first node. The third switching element is electrically connected between a third node electrically connected to the negative electrode terminal of the second direct current power source and the second node. The fourth switching element is electrically connected between the negative electrode terminal of the first direct current power source and the third node. The power converter further includes a first and second reactor. The first reactor is electrically connected between a positive terminal of the first direct current power source and the second node. The second reactor is electrically connected between a positive terminal of the second direct current power source and the first node.

In other aspect of the present invention, the power source system includes the first direct current power source, the second direct current power source, the power converter, and the control device. The power converter s configured to perform a direct current power conversion between the power source line electrically connected to the load, and the first and second direct current power sources. The control device is configured to control on-off of the plurality of switching elements in accordance with a pulse width modulation control, so as to control output voltage on the power source line. At least a portion of the plural switching elements included in the power converter is disposed so as to be included in both of a first power conversion path formed between the first direct current power source and power source line, and a second power conversion path formed between the second direct current power source and the power source line. The power converter has a first operation mode to for performing direct current power conversion between the first and second direct current power sources and the power source line in parallel. In the first operation mode, the control device is configured to generate an on-off control signal of the plurality of switching elements so as to control output of the first and second direct current power source by varying an on-off period ratio of the plural switching elements. The control signal is adjusted to have a phase of current so as to superimpose one of a rising timing or a falling timing of electric current in the first direct current power source on the other of a rising liming on a falling timing of electric current in the second direct current power source.

Preferably, the plurality of switching elements include first to fourth switching elements. The first switching element is electrically connected between the power source line and the first node. The second switching element is electrically connected between the second node and the first node. The third switching element is electrically connected between the third node electrically connected to the negative electrode terminal of the second direct current power source and the second node. The fourth switching element is electrically connected between the negative electrode terminal of the first direct current power source and the third node. The power converter further includes first and second reactors. The first reactor is electrically connected between the positive terminal of the first direct current power source and the second node. The second reactor is electrically connected between the positive terminal of the second direct current power source and the first node.

More preferably, the control signal is adjusted to have a phase of current so as to superimpose a falling timing of electric current in the first direct current power source on a rising timing of electric current in the second direct current power source, in a condition that both of the first and second direct current power sources are in powering condition.

In addition, more preferably, the control signal is adjusted to have a phase of current so as to superimpose a rising timing of electric current in the first direct current power source on a falling timing of electric current in the second direct current power source, in a condition that both of the first and second direct current power sources are in regenerative condition.

Instead, more preferably, the control signal is adjusted to have a phase of current so as to superimpose a falling timing of electric current in the first direct current power source on a falling timing of electric current in the second direct current power source, in a condition that the first direct current power source and the second direct current power sources are in regenerative condition and powering condition, respectively.

Instead, more preferably, the control signal is adjusted to have a phase of current so as to superimpose a rising timing of electric current in the first direct current power source on a rising timing of electric current in the second direct current power source, in a condition that the first direct current power source and the second direct current power sources are in powering condition and regenerative condition, respectively.

In addition, more preferably, the power converter further includes a second operation mode for performing direct current power conversion in a condition that the first and second direct current power sources are electrically connected in series in relation to the power source line. The control device makes an adjustment of the control signal to achieve a phase of current so as to superimpose a rising timing of electric current in the first direct current power source on a falling timing of electric current in the second direct current power source, in a condition that both of the first and second direct current power sources are in powering condition in the second operation mode.

Instead, more preferably, in the second operation mode, the control device makes an adjustment of the control signal to achieve a phase of current so as to superimpose a falling timing of electric current in the first direct current power source on a rising timing of electric current in the second direct current power source, in a condition that both of the first and the second direct current power sources are in regenerative condition.

Preferably, the control device makes an adjustment of the phase of current by varying a phase difference between the first carrier signal utilized for the first pulse width modulation control to control the output of the first direct current power source, and the second carrier signal utilized for the second pulse width modulation control to control the output of the second direct current power source.

Effect of the Invention

According to the power source system of the present invention, it is possible to perform direct current power conversion with high efficiency by suppressing a loss of semiconductor switching elements for power, as well as convert output voltages of two direct current power sources and supply the same to the load.

BRIEF DESCRIPTION OF THE DRAWINGS

FIG. 28 shows a table indicating settings of each control data in the series connection mode, FIG. 29 shows a table for comparison of the control signal between the parallel connection mode and the series connection mode, FIG. 34 shows a table showing the comparison of the control signal in when the carrier phase control according to first embodiment is also applied to the series connection mode, with the control signal in the parallel connection mode.

MODES FOR CARRYING OUT THE INVENTION

Figure 1:
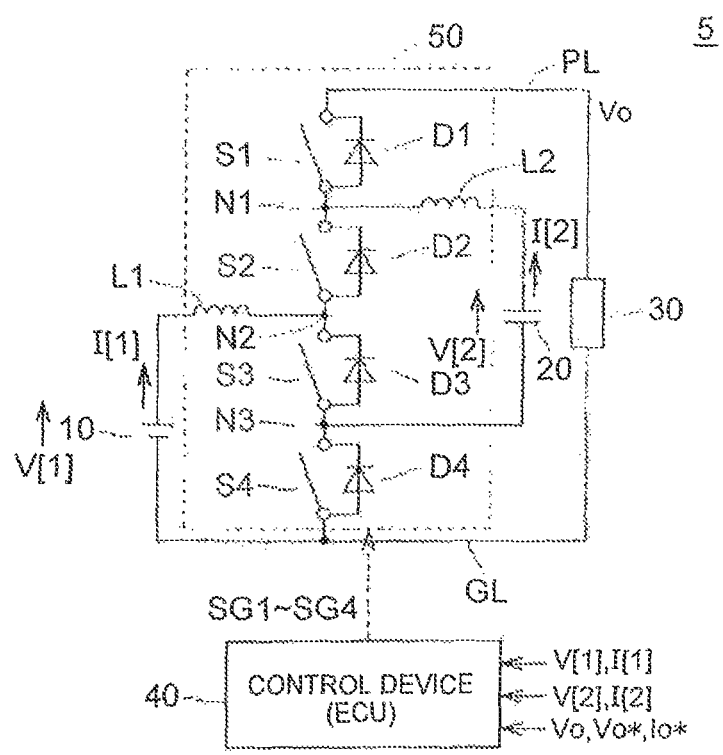
FIG. 1 shows a circuit diagram indicating an example of a configuration of a power source system according to an embodiment of the present invention.

A detailed description will hereinafter be made on an embodiment of the present invention with reference to the drawings. It should be noted that same or corresponding components in the drawings are denoted by the same reference numerals and descriptions thereof are not repeated.

First Embodiment

Circuit Configuration

FIG. 1 shows a circuit diagram indicating a configuration example of a power source system according to an embodiment of the present invention.

With reference to FIG. 1, a power source system 5 is provided with a direct current power source 10, a direct current power source 20, a load 30, a control device 40 and a power converter 50.

In the embodiment of the present invention, the direct current power sources 10, 20 is composed of an electric storage device such as secondary battery, an electric dual layer capacitor and the like. For example, the direct current power source 10 is composed of a second battery such as lithium ion secondary battery and nickel hydrogen battery. The direct current power source 20 is composed of a direct current voltage source element exhibiting superior output performance such as electric dual layer capacitor and lithium ion capacitor. The direct current power source 10 and the direct current power source 20 correspond to a "first direct current power source" and a "second direct current power source", respectively. However, it is possible to use the same type of electric storage devices for configuring the direct current power sources 10, 20.

The power converter 50 is connected between the direct current power source 10, the direct current power source 20 and the load 30. The power converter 50 is configured to control a direct current voltage (hereinafter may be also referred to as an output voltage, Vo) on a power source line PL connected to the load 30, in accordance with a voltage command value.

The load 30 operates in response to the output voltage Vo of the power converter 50. The voltage command value of the output voltage Vo is set to a voltage appropriate in operation of the load 30. The voltage command value may be set variable in accordance with the condition of the load 30. In addition, the load 30 may be configured to generate the recharging power of the direct current power sources 10, 20 by regenerative power generation and the like.

The power converter 50 includes semiconductor switching elements S1 to S4 for power, and reactors L1, L2. In this embodiment, semiconductor switching elements (hereinafter may simply be referred to as "switching elements") for power may be formed of IGBT (Insulated Gate Bipolar Transistor), MOS (Metal Oxide Semiconductor) transistor for power, bipolar transistor for power and the like. Anti-parallel diodes D1 to D4 are disposed for switching elements S1 to S4. The switching elements S1 to S4 are capable of controlling on-off switching in response to control signals SG1 to SG4 from the control device 40.

The switching element S1 is electrically connected between the power source line PL and a node N1. The reactor L2 is connected between the node N1 and a positive terminal of the direct current power source 20. The switching element S2 is electrically connected between the node N1 and a node N2. The reactor L1 is connected between the node N2 and a positive terminal of the direct current power source 10. The switching element S3 is electrically connected between the node N2 and a node N3. The switching element S4 is electrically connected between the node N3 and a grounded line GL. The grounded line GL is electrically connected between the load 30 and a negative electrode terminal of the direct current power source 10.

The control device 40 is composed of a CPU (Central Processing Unit) (now shown) and an electronic control unit (ECU) having a memory, for example. The control device 40 is configured to perform calculation processing using a detection value of each sensor based on a map and a program which are stored in the memory. Instead, at least part of the control devices 40 may be configured to perform a predetermined numerical and logical calculation processing with hardware such as an electronic circuit and the like.

The control device 40 is configured to generate control signals SG1 to SG4 for controlling on-off switching of the switching elements S1 to S4, in order to control the output voltage Vo.

Detectors (a voltage sensor and an electric current sensor) not shown in FIG. 1 are provided for detecting a voltage (referred to as V [1]) and an electric current (referred to as I [1]) of the direct current power source 10, a voltage (referred to as V [2]) and an electric current (referred to as I [2]) of the direct current power source 20, and the output voltage Vo. These outputs from the detectors are input to the control device 40.

The power converter 50 is composed of boost chopper circuits corresponding to the direct current power source 10 and the direct current power source 20, as understood by referring to FIG. 1. Namely, for the direct current power source 10, a first boost chopper circuit achieving bi-directional current is composed of switching elements S1, S2 serving as upper arm elements and switching elements S3, S4 serving as lower arm elements. As well, for the direct current power source 20, a second boost chopper circuit achieving bi-directional current is composed of switching elements S1, S4 serving as upper arm elements and switching elements S2, S3 serving as lower arm elements. The switching elements S1 to S4 includes a power conversion path formed between the direct current power source 10 and the power source line PL in the first boost chopper circuit, and a power conversion path formed between the direct current power source 10 and the power source line PL in the second boost chopper circuit.

It is known that the voltage conversion ratio (boost ratio) of the boost chopper circuit is represented by the following formula (1) using a voltage Vi in low pressure side (direct current power source side), a voltage VH in high pressure side (load side), and a duty ratio DT of the lower arm element. The duty ratio DT is defined as on-period ratio of the lower arm element, with respect to the sum of on-period and off-period of the lower arm element, that is, the switching frequency. The upper arm element is turned on in the off-period of the lower arm element.

$$VH = 1/(1-DT) * Vi \quad (1)$$

The power converter 50 according to this embodiment is capable of switching modes for operation between a parallel connection mode for supplying and receiving power between the load 30 and each of the direct current power sources 10, 20 which are connected in parallel, and a series connection mode for supplying and receiving power between the load 30 and each of the direct current power sources 10, 20 which are connected in series by controlling the switching elements S1 to S4. The parallel connection mode corresponds to "first operation mode", while the series connection mode corresponds to "second operation mode". In the first embodiment, a description will be made on control operation in the parallel connection mode, in particular, control for reducing power loss of the switching element.

(Circuit Operation in the Parallel Connection Mode)

The circuit operation of the power converter 50 in the parallel connection mode will be described.

Figure 2:
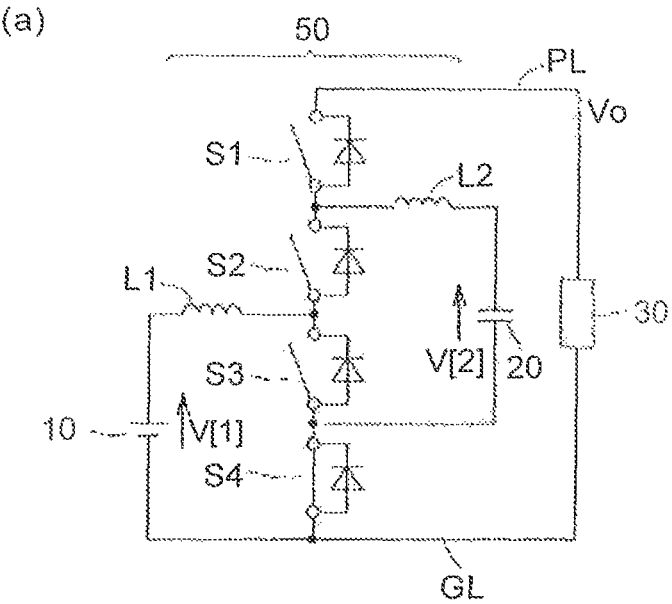
FIG. 2 shows a circuit diagram indicating a first circuit operation in a parallel connection mode.
Figure 2:
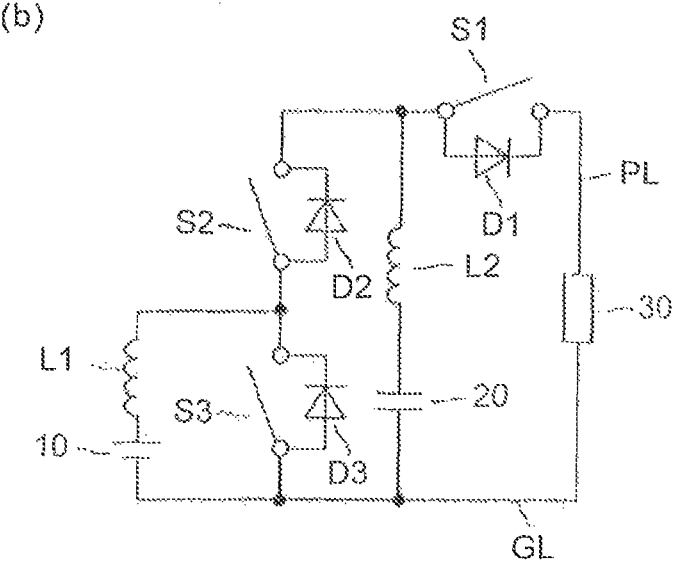
Figure 3:
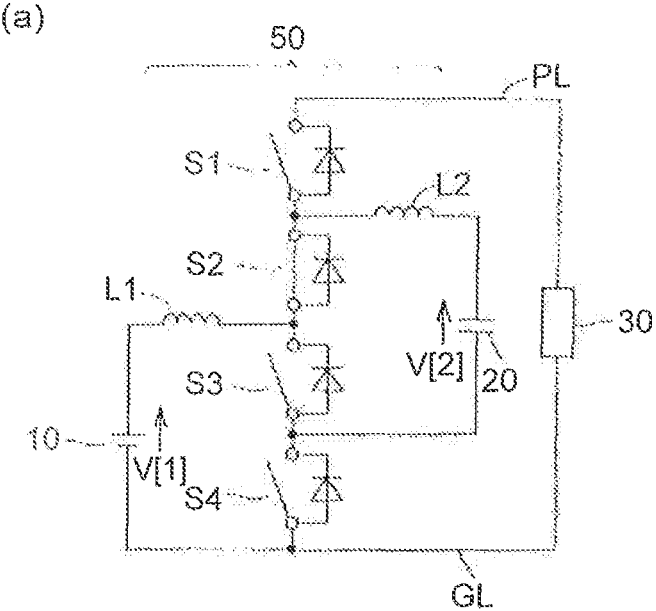
FIG. 3 shows a circuit diagram indicating a second circuit operation in a parallel connection mode.
Figure 3:
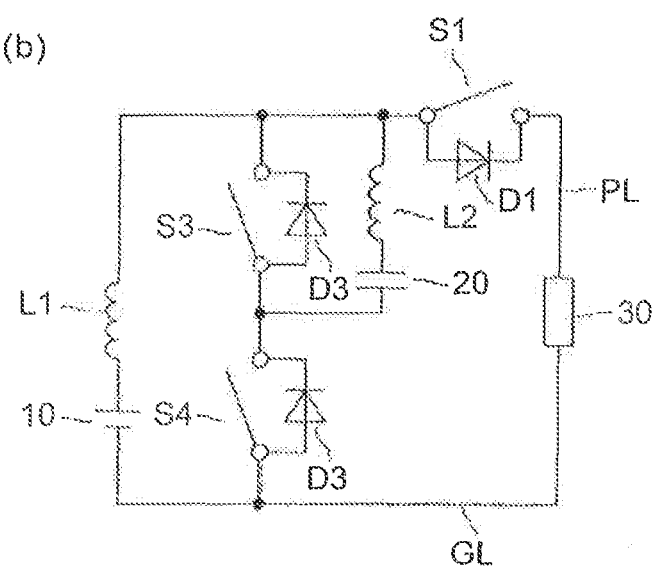

As shown in FIG. 2 and FIG. 3, it is possible to connect each of the direct current power sources 10 and 20 with the power source line PL in parallel by turning on the switching element S4 or S2. In the parallel connection mode, an equivalent circuit is formed differently according to the relationship in height between a voltage V [1] of the direct current power source 10 and a voltage V [2] of the direct current power source 20.

As shown in FIG. 2 (a), it is possible to connect the direct current power sources 10 and 20 in parallel via the switching elements S2, S3 by turning on the switching element S4, when a relation of V [2]>V [1] is satisfied. The equivalent circuit in this instance is shown in FIG. 2 (b).

With reference to FIG. 2 (b), it is possible to achieve on-period and off-period of the lower arm element alternately, by performing the on-off control for the switching element S3, between the direct current power source 10 and the power source line PL. As well, it is possible to achieve on-period and off-period of the lower arm element of the boost chopper circuit alternately, by performing the on-off control commonly for the switching element S2 and the switching element S3, between the direct current power source 20 and the power source line PL. The switching element S1 operates as a switch for controlling regeneration from the load 30.

Meanwhile, as shown in FIG. 3 (a), it is possible to connect the direct current power sources 10 and 20 in parallel via the switching elements S3, S4 by turning on the switching element S2, when a relation of V [1]>V [2] is satisfied. The equivalent circuit in this instance is shown in FIG. 3 (b).

With reference to FIG. 3 (b), it is possible to achieve on-period and off-period of the lower arm element alternately, by performing the on-off control for the switching element S3, between the direct current power source 20 and the power source line PL. As well, it is possible to achieve on-period and off-period of the lower arm element of the boost chopper circuit alternately, by performing the on-off control commonly for the switching elements S3, S4, between the direct current power source 10 and the power source line PL. The switching element S1 operates as a switch for controlling regeneration from the load 30.

Figure 4:
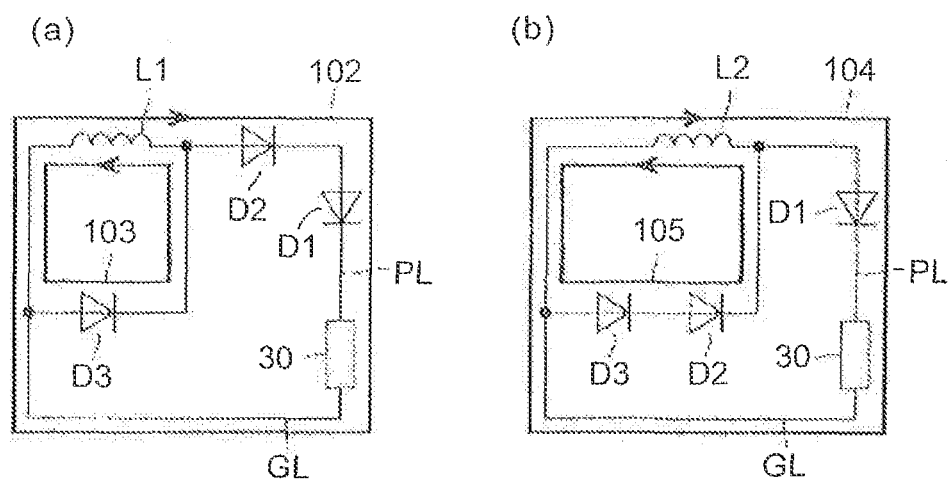
FIG. 4 shows a circuit diagram indicating a back-flow path of a reactor in the circuit operation shown in FIG. 2.

In the circuit operation shown in FIG. 3 and FIG. 4, it is necessary to provide a path for discharging energy accumulated in the reactors L1, L2 in any instance, for the following reason: when reactors through which different electric currents flow are connected to each other in series via the switching element, circuit may be damaged due to generation of spark and the like caused by inconsistency between the accumulated energy and the electric current possibly. Accordingly, it is necessary to provide a back-flow path for discharging accumulated energies of the reactor L1, L2 on the circuit.

FIG. 4 shows a back-flow path of the reactor in circuit operation shown in FIG. 2 (V [2]>V [1] in the parallel connection mode). FIG. 4 (a) shows a back-flow path of the reactor L1, while FIG. 4 (b) shows a back-flow path of the reactor L2.

With reference to FIG. 4 (a), in the equivalent circuit shown in FIG. 2 (b), it is possible to perform back-flow of electric current of the reactor L1 in powering condition via the electric current path 102 passing through diodes D2, D1, a power source line PL, the load 30 and the grounded line GL. In addition, it is possible to perform back-flow of electric current of the reactor L1 in regenerative condition via the electric current path 103 passing through a diode D3, and to discharge energy accumulated in the reactor L1 via the electric current paths 102, 103.

With reference to FIG. 4 (b), in the equivalent circuit shown in FIG. 2 (b), it is possible to perform back-flow of electric current of the reactor L2 in powering condition via the electric current path 104 passing through the diode D1, a power source line PL, the load 30 and the grounded line GL. In addition, it is possible to perform back-flow of electric current of the reactor L2 in regenerative condition via the electric current path 105 passing through the diodes D3, D2, and to discharge energy accumulated in the reactor L2 via the electric current paths 104, 105.

Figure 5:
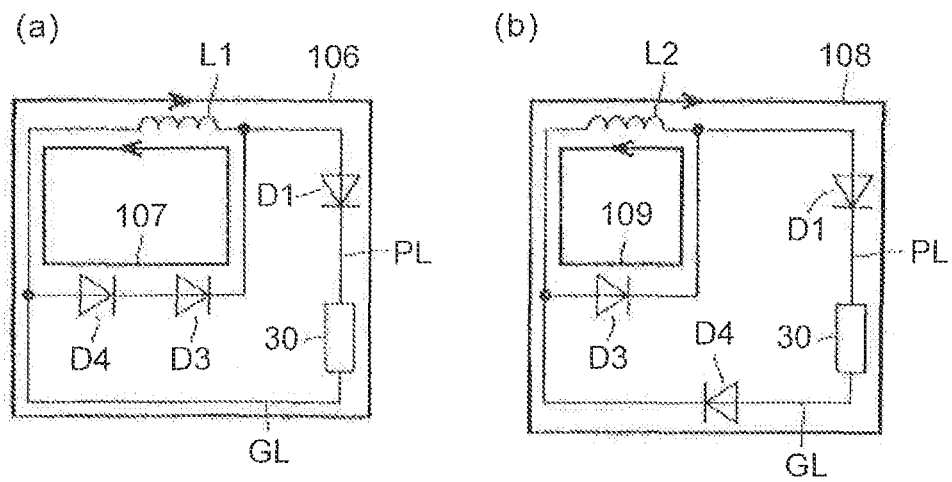
FIG. 5 shows a circuit diagram indicating a back-flow path of a reactor in the circuit operation shown in FIG. 3.

FIG. 5 shows a back-flow path of the reactor in circuit operation shown in FIG. 3 (V [1]>V [2] in the parallel connection mode). FIG. 5 (a) shows a back-flow path of the reactor L1, while FIG. 5 (b) shows a back-flow path of the reactor L2.

With reference to FIG. 5 (a), in the equivalent circuit shown in FIG. 3 (b), it is possible to perform back-flow of electric current of the reactor L1 in powering condition via the electric current path 106 passing through the diode D1, the power source line PL, the load 30 and the grounded line GL. In addition, it is possible to perform back-flow of electric current of the reactor L1 in regenerative condition via the electric current path 107 passing through diodes D4, D3, and to discharge energy accumulated in the reactor L1 via the electric current paths 106, 107.

With reference to FIG. 5 (b), in the equivalent circuit shown in FIG. 3 (b), it is possible to perform back-flow of electric current of the reactor L2 in powering condition via the electric current path 108 passing through the diode D1, the power source line PL, the load 30, the grounded line GL and the diode D4. In addition, it is possible to perform back-flow of electric current of the reactor L2 in regenerative condition via the electric current path 109 passing through the diode D3, and to discharge energy accumulated in the reactor L2 via the electric current paths 108, 109.

As described above, in any operation condition in the parallel connection mode, the power converter 50 is securely connected to the back-flow path for discharging energies accumulated in the reactors L1, L2.

Next, boost operation of the power converter 50 in the parallel connection mode will be described in detail, with reference to FIG. 6 and FIG. 7.

Figure 6:
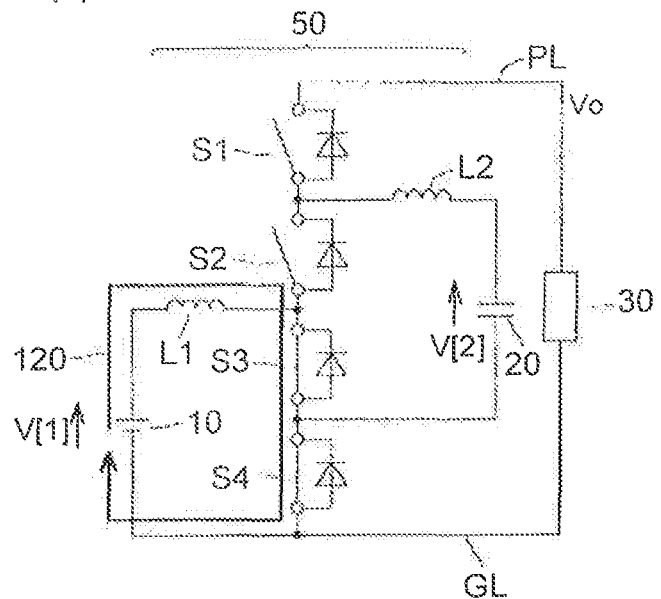
FIG. 6 shows a circuit diagram indicating a direct current power conversion (boost operation) for a first direct current power source in the parallel connection mode.
Figure 6:
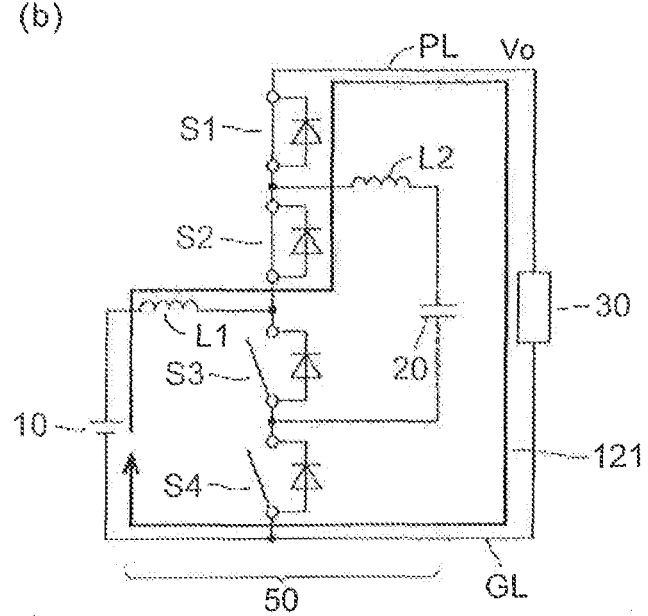

FIG. 6 shows a direct current power conversion (boost operation) for the direct current power source 10 in the parallel connection mode.

With reference to FIG. 6 (*a*), it is possible to form an electric current path 120 for accumulating energy in the reactor L1 by turning on a pair of switching elements S3, S4 while turning off a pair of switching elements S1, S2, achieving on-condition of the lower arm element of the boost chopper circuit.

Meanwhile, with reference to FIG. 6 (*b*), it is possible to form an electric current path 121 for outputting the accumulated energy of the reactor L1 and the energy of the direct current power source 10, by turning off a pair of the switching elements S3, S4 while turning on a pair of the switching elements S1, S2, achieving on-condition of the upper arm element of the boost chopper circuit.

The electric current path 120 shown in FIG. 6 (*a*) and the electric current path 121 shown in FIG. 6 (*b*) are alternately formed by repetitively achieving the first period and the second period alternately. In the first period, a pair of the switching elements S3, S4 is turned on while at least one of the switching elements S1, S2 is turned off. In the second period, a pair of the switching elements S1, S2 is turned on while at least one of switching elements S3, S4 is turned off.

As a result, it is possible to form the boost chopper circuit which includes a pair of the switching elements S1, S2 equivalently serving as upper arm elements and a pair of the switching elements S3, S4 equivalently serving as lower arm elements, for the direct current power source 10. In the direct current power conversion operation shown in FIG. 6, the direct current power sources 10 and 20 are not interfered with each other, because of the absence of an electric current flowing path leading to the direct current power source 20. Namely, it is possible to control input and output of the power individually to the direct current power sources 10 and 20.

In such a direct current power conversion, the relationship between the voltage V [1] of the direct current power source 10 and the output voltage Vo of the power source line PL can be represented by the following formula (2). In the formula (2), Da represents a duty ratio during the first period where a pair of switching elements S3, S4 is turned on.

$$Vo = 1/(1-Da) \cdot V[1] \quad (2)$$

Figure 7:
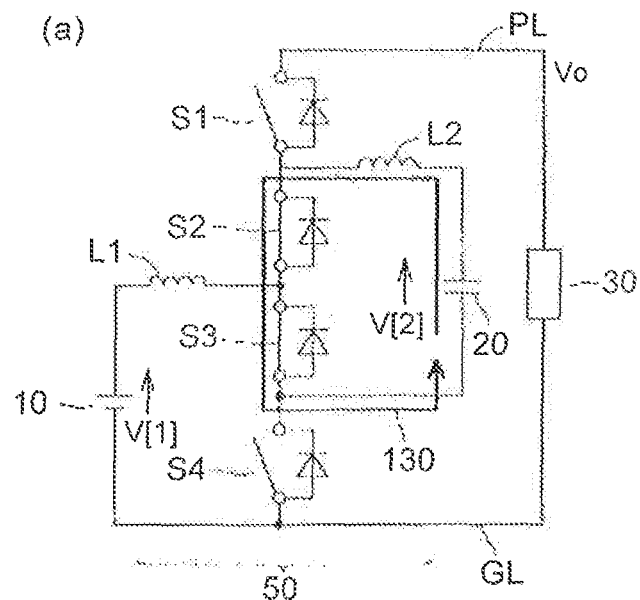
FIG. 7 shows a circuit diagram indicating a direct current power conversion (boost operation) for a second direct current power source in the parallel connection mode.
Figure 7:
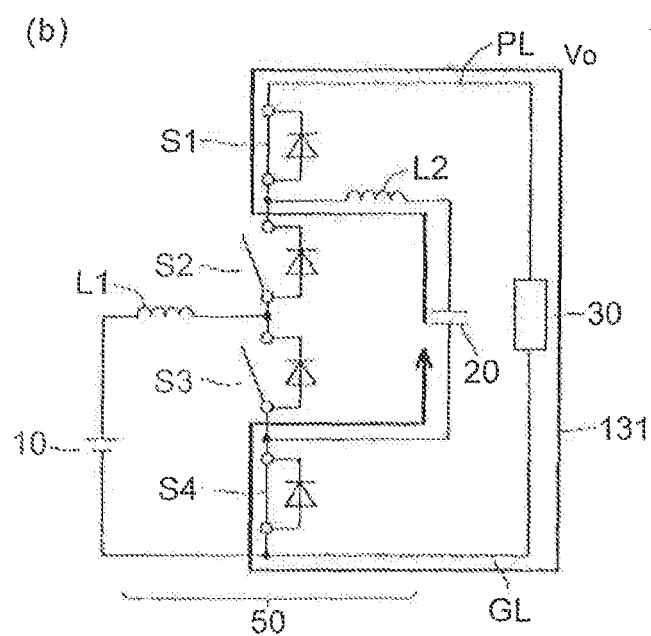

FIG. 7 shows a direct current power conversion (boost operation) for the direct current power source 20 in the parallel connection mode.

With reference to FIG. 7 (*a*), it is possible to form an electric current path 130 for accumulating energy in the reactor L2, by turning on a pair of the switching elements S2, S3 while turning off a pair of the switching elements S1, S4, achieving on-condition of the lower arm element of the boost chopper circuit.

Meanwhile, with reference to FIG. 7 (*b*), it is possible to form an electric current path 131 for outputting the energy accumulated in the reactor L2 and the energy of the direct current power source 20, by turning off a pair of the switching elements S2, S3 while turning on a pair of the switching elements S1, S4, achieving on-condition of the upper arm element of the boost chopper circuit.

The electric current path 130 shown in FIG. 7 (*a*) and the electric current path 131 shown in FIG. 7 (*b*) are alternately formed by repetitively achieving the first period and the second period alternately. In the first period, at least one of the switching elements S2, S3 is turned on while at least one of switching elements S1, S4 is turned off. In the second period, a pair of the switching elements S1, S4 is turned on while at least one of switching elements S2, S3 is turned off.

As a result, it is possible to form the boost chopper circuit which includes a pair of the switching elements S1, S4 equivalently serving as upper arm elements and a pair of the switching elements S2, S3 equivalently serving as lower arm elements, for the direct current power source 20. In the direct current power conversion operation shown in FIG. 7, the direct current power sources 10 and 20 are not interfered with each other, because of the absence of an electric current flowing path leading to the direct current power source 10. Namely, it is possible to control input and output of the power individually to the direct current power sources 10 and 20.

In such a direct current power conversion, the relationship between the voltage V [2] of the direct current power source 20 and the output voltage Vo of the power source line PL can be represented by the following formula (3). In the formula (3), Db represents a duty ratio during the first period where a pair of switching elements S2, S3 is turned on.

$$Vo = 1/(1-Db) \cdot V[2] \quad (3)$$

(Basic Control Operation in the Parallel Connection Mode)

The control operation of the power converter 50 in the parallel connection mode will be described. The control operation described hereinafter can be achieved by hardware processing and/or software processing of the control device 40.

Figure 8:
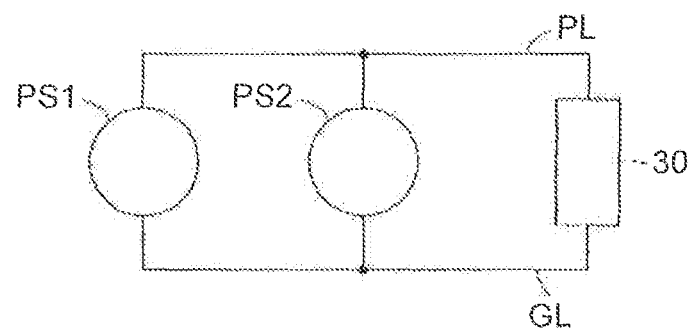
FIG. 8 shows a block diagram indicating an equivalent circuit from a load side in the parallel connection mode.

FIG. 8 shows an equivalent circuit in the parallel connection mode viewed from the load side. With reference to FIG. 8, in the parallel connection mode, it is possible to serve and receive power to/from the load 30 in parallel via a power source PS1 performing direct current power conversion between the direct current power source 10 and the load 30 as well as a power source PS2 performing direct current power conversion between the direct current power source 20 and the load 30. The power source PS1 corresponds to a boost chopper circuit performing the direct current power conversion operation shown in FIG. 6. As well, the power source PS2 corresponds to a boost chopper circuit performing the direct current power conversion operation shown in FIG. 7.

Namely, the power source PS1 has a function for performing direct current power conversion according to the voltage conversion ratio represented by the formula (2) between the voltage V [1] of the direct current power source 10 and the output voltage Vo. As well, the power source PS2 has a function for performing direct current power conversion according to the voltage conversion ratio represented by the formula (3) between the voltage V [2] of the direct current power source 20 and the output voltage Vo.

In the parallel connection mode, when the control (voltage control of the output voltage Vo) is performed commonly in both power sources simultaneously, the load side is connected to the power sources PS1 and PS2 in parallel, possibly resulting in circuit damage. Accordingly, one of the power source PS1 and the power source PS2 operates as a voltage source for controlling the output voltage Vo. The other of the power source PS1 and the power source PS2 operates as a current source for controlling the electric current of the power source to an electric current command value. The voltage conversion ratio of each of the power sources PS1, PS2 is controlled so as to operate as either of the voltage source and an electric current source.

When the PS1 operates as an electric current source while the PS2 operates as a voltage source, the following formula (4) is satisfied using the power P [1] of the direct current power source 10, the power P [2] of the direct current power source 20, power Po of the load 30 and the electric current command value Ii* of the electric current source.

$$P[2]=Po-P[1]=Po-V[1] \cdot Ii^* \quad (4)$$

It is possible to control the power P [1] of the direct current power source 10 forming the electric current source at the power command value Pi* by setting the electric current command value Ii* according to a detected value of the voltage V [1] of the direct current power source 10 so as to keep constant P*=V [1]·Ii*.

Meanwhile, when the power source PS2 operates as an electric current source while the power source PS1 operates as a voltage source, the following formula (5) is satisfied.

$$P[1]=Po-P[2]=Po-V[2] \cdot Ii^* \quad (5)$$

As well, it is also possible to control the power P [2] of the direct current power source 20 forming the electric current source to be the power command value Pi* by setting the electric current command value Ii* so as to keep constant P*=V [2]·Ii*.

Figure 9:
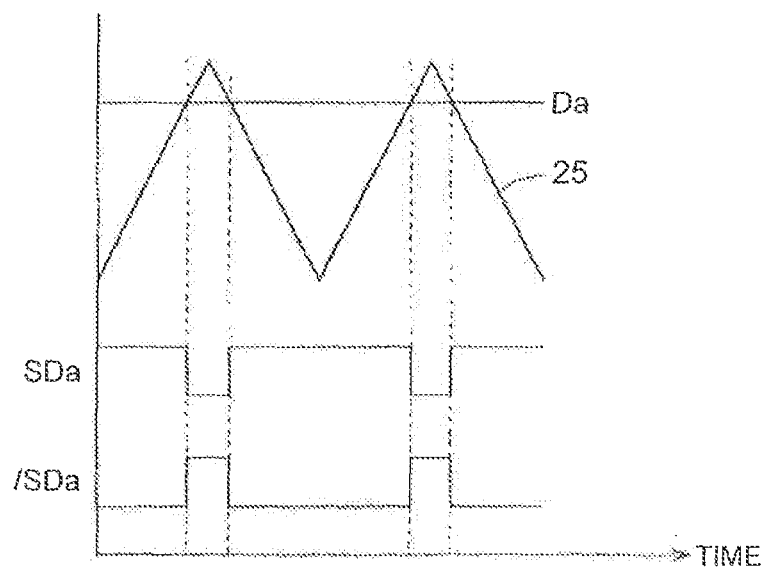
FIG. 9 shows a waveform diagram indicating an example of control operation in the first power source.

FIG. 9 shows a waveform diagram indicating a specific example of control operation of the power source PS1 corresponding to the direct current power source 10.

With reference to FIG. 9, the duty ratio Da (see formula (2)) of the power source PS1 is calculated by a voltage feedback control (FIG. 11) for operating as a voltage source or an electric current feedback control (FIG. 12) for operating as an electric current source. In FIG. 9, voltage signal representing duty ratio Da is shown by same symbol, Da.

The control pulse signal SDa of the power source PS1 is generated by the pulse width modulation (PWM) control based on comparison of the duty ratio Da with periodic carrier signal 25. In general, triangular waveform or sawtooth waveform is utilized for achieving the carrier signal 25. The period of the carrier signal 25 corresponds to a switching frequency of each switching element. The amplitude of the carrier signal 25 is set to a voltage corresponding to Da=1.0.

The control pulse signal SDa is set to a logical high level (hereinafter referred to as H level) when the voltage indicating the duty ratio Da is higher than that of the carrier signal 25. Meanwhile, the control pulse signal SDa is set to a logical low level (hereinafter referred to as L level) when the voltage indicating the duty ratio Da is lower than that of the carrier signal 25. The ratio of H level period to the period of the control pulse signal SDa (the total of H level period and L level period), that is, the duty ratio of the control pulse signal SD equals to Da.

Control pulse signal /SDa is an inversion signal of the control pulse signal SDa. With increasing the duty ratio Da, H level period of the control pulse signal SDa is longer. In contrast, with decreasing the duty ratio Da, L level period of the control pulse signal SDa is longer.

The control pulse signal SDa corresponds to a signal controlling on-off switching of the lower arm element of the boost chopper circuit shown in FIG. 6. Namely, the lower arm element is turned on during H level period of the control pulse signal SDa, and turned off during L level period.

Meanwhile, the control pulse signal /SDa corresponds to a signal for controlling on-off switching of the upper arm element of the boost chopper circuit shown in FIG. 6.

Figure 10:
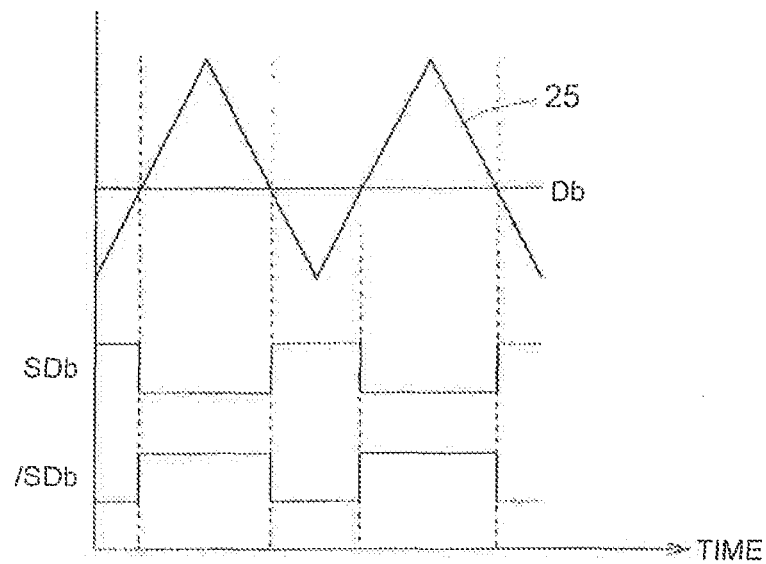
FIG. 10 shows a waveform diagram indicating an example of control operation in the second power source.

FIG. 10 shows a waveform diagram indicating a specific example of control operation in the power source PS2 corresponding to the direct current power source 20.

With reference to FIG. 10, in the power source PS2 performs the same PWM control as the power source PS1, for generating the control pulse signal SDb and its inversion signal /SDb based on the duty ratio Db (see formula (3)). The duty ratio of the control pulse signal SDb equals to Db. The duty ratio of the control pulse signal /SDb equals to (1.0−Db). Namely, with increasing the duty ratio Db, H level period of the control pulse signal SDb is longer. In contrast, with decreasing the duty ratio Db, L level period of the control pulse signal SDb is longer.

The control pulse signal SDb corresponds to a signal controlling on-off switching of the lower arm element of the boost chopper circuit shown in FIG. 7. The control pulse signal /SDb corresponds to a signal controlling on-off switching of the upper arm element of the boost chopper circuit shown in FIG. 7.

The duty ratio Db is calculated by the electric current feedback control (FIG. 12) for allowing the power source PS2 to operate as an electric current source, when the power source PS1 operates as a voltage source. In contrast, the duty ratio Db is calculated by the voltage feedback control (FIG. 11) for allowing the power source PS2 to operate as a voltage source, when the power source PS1 operates as an electric current source.

Figure 11:
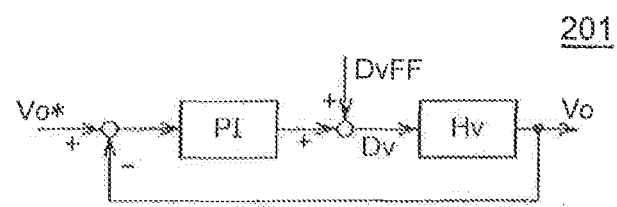
FIG. 11 shows an example of a configuration of control block of power source operating as a voltage source.

FIG. 11 shows a configuration example of a control block 201 of a power source operating as a voltage source. With reference to FIG. 11, the control block 201 generates a duty ratio command value Dv for voltage control in accordance with the total of a voltage command value Vo* of the output voltage Vo, a feedback control amount obtained by PI (proportional integration) calculation of a deviation from the output voltage Vo (detected value), and a feed-forward control amount DvFF. Transfer function Hv corresponds to a transfer function of the power source PS1 or the power source PS2 operating as a voltage source.

Figure 12:
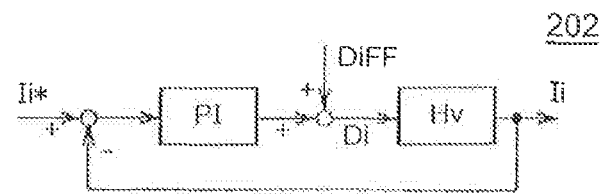
FIG. 12 shows an example of a configuration of control block of power source operating as an electric current source.

FIG. 12 shows a configuration example of a control block 202 of a power source operating as an electric current source. With reference to FIG. 12, the control block 202 generates a duty ratio command value Di for the electric current control in accordance with the total of the electric current command value Ii*, a feedback control amount obtained by PI (proportional integration) calculation of a deviation from the electric current Ii (detected value) of the electric current controlled direct current power source 10 or 20, and a feed-forward control amount DiFF. Transfer function Hi corresponds to a transfer function of the power source PS1 or PS2 operating as an electric current source.

Figures 13, 14:
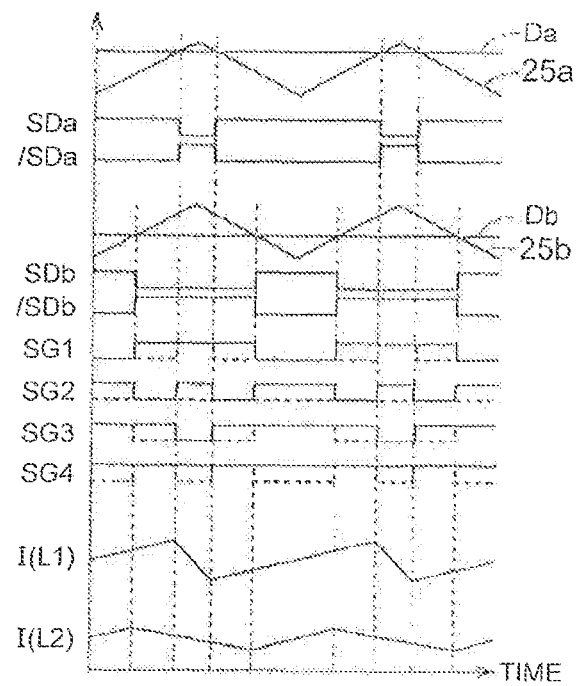
FIG. 13 shows a table indicating settings of each control data in the parallel connection mode.
FIG. 14 shows a waveform diagram indicating an example of control operation in the parallel connection mode, when carrier signals having the same phase are utilized.

FIG. 13 shows settings of each control data in the parallel connection mode. FIG. 13 (in left column) shows settings of each control data when the power source PS1 (the direct current power source 10) serves as an electric current source while the power source PS2 (the direct current power source 20) serves as a voltage source.

With reference to the left column shown in FIG. 13, the duty ratio command value Dv for voltage control is utilized as the duty ratio Db of the power source PS2 (the direct current power source 20). As well, the duty ratio command value Di for the electric current control is utilized as the duty ratio Da of the power source PS1 (the direct current power source 10). The electric current Ii controlled by the electric current control becomes the electric current I [1] of the direct current power source 10. The voltage controlled by the voltage control is the output voltage Vo, irrespective of whether the voltage source is the power source PS1 or PS2.

Transfer function Hv shown in FIG. 11 corresponds to a transfer function of the boost chopper circuit corresponding to the direct current power source 20 shown in FIG. 7. Transfer function Hi shown in FIG. 12 corresponds to a transfer function of the boost chopper circuit corresponding to the direct current power source 10 shown in FIG. 6.

The feed forward control amount DvFF in the voltage control is set according to the voltage difference between the output voltage Vo and the voltage V [2] of the direct current power source 20, as represented by the following formula (6). The feed forward control amount DiFF in the electric current control is set according to the voltage difference between the output voltage Vo and the voltage V [1] of the direct current power source 10, as represented by the following formula (7).

$$DvFF=(Vo-V[2])/Vo \quad (6)$$

$$DiFF=(Vo-V[1])/Vo \quad (7)$$

The control pulse signals SDa and /SDa shown in FIG. 9 are generated according to the duty ratio Da (Da=Di). As well, the control pulse signals SDb and /SDb shown in FIG. 10 are generated according to the duty ratio Db (Db=Dv).

The control signals SG1 to SG4 for controlling on-off switching of the switching elements S1 to S4 are set based on the control pulse signal for the electric current control of the power source PS1 and the control pulse signal for voltage control of the power source PS2. Specifically, the control signals SG1 to SG4 are set based on logical calculation of control pulse signals (more specifically, in an aspect employing logical sum).

The switching element S1 forms the upper arm element in each of the boost chopper circuits shown in FIG. 6 and FIG. 7. Accordingly, the control signal SG1 for controlling on-off switching of the switching element S1 is generated according to the logical sum of the control pulse signals /SDa and /SDb. Namely, the control signal SG1 is set to H level during H level period for at least one of the control pulse signals /SDa and /SDb. In addition, the control signal SG1 is set to L level during L level period for both of the control pulse signals /SDa and /SDb.

As a result, it is possible to perform the on-off control of the switching element S1 for achieving both of a function of the upper arm element of the boost chopper circuit (the direct current power source 10) shown in FIG. 6 and that of the upper arm element of the boost chopper circuit (the direct current power source 20) shown in FIG. 7.

The switching element S2 forms the upper arm element of the boost chopper circuit shown in FIG. 6, and the lower arm element of the boost chopper circuit shown in FIG. 7. Accordingly, the control signal SG2 for performing the on-off control of the switching element S2 is generated according to the logical sum of the control pulse signals /SDa and /SDb. Namely, the control signal SG2 is set to H level during H level period for at least one of the control pulse signals /SDa and /SDb. In addition, the control signal SG2 is set to L level during L level period for both of the control pulse signals /SDa and /SDb. With this arrangement, it is possible to perform the on-off control of the switching element S2 for achieving both of a function of the upper arm element of the boost chopper circuit (the direct current power source 10) shown in FIG. 6 and that of the lower arm element of the boost chopper circuit (the direct current power source 20) shown in FIG. 7.

As well, the control signal SG3 of the switching element S3 is generated according to the logical sum of the control pulse signals SDa and SDb. With this arrangement, it is possible to perform the on-off control of the switching element S3 for achieving both of a function of the lower arm element of the boost chopper circuit (the direct current power source 10) shown in FIG. 6 and that of the lower arm element of the boost chopper circuit (the direct current power source 20) shown in FIG. 7.

In addition, the control signal SG4 of the switching element S4 is generated according to the logical sum of the control pulse signals SDa and /SDb. With this arrangement, it is possible to perform the on-off control of the switching element S4 for achieving both of a function of the lower arm element of the boost chopper circuit (the direct current power source 10) shown in FIG. 6 and that of the upper arm element of the boost chopper circuit (the direct current power source 20) shown in FIG. 7.

FIG. 13 (in right column) shows settings of each control data when the power source PS1 (the direct current power source 10) serves as a voltage source while the power source PS2 (the direct current power source 20) serves as an electric current source.

With reference to the right column shown in FIG. 13, the duty ratio command value Dv for voltage control is utilized as the duty ratio Da of the power source PS1 (the direct current power source 10). As well, the duty ratio command value Di for the electric current control is utilized as the duty ratio Db of the power source PS2 (the direct current power source 20). The electric current Ii controlled by the electric current control becomes the electric current I [2] of the direct current power source 20. The voltage controlled by the voltage control is the output voltage Vo.

Transfer function Hv shown in FIG. 11 corresponds to a transfer function of the boost chopper circuit corresponding to the direct current power source 10 shown in FIG. 6. Transfer function Hi shown in FIG. 12 corresponds to a transfer function of the boost chopper circuit corresponding to the direct current power source 20 shown in FIG. 7.

The feed forward control amount DvFF in the voltage control is set according to the voltage difference between the output voltage Vo and the voltage V [1] of the direct current power source 20, as represented by the following formula (8). The feed forward control amount DiFF in the electric current control is set according to the voltage difference between the output voltage Vo and the voltage V [2] of the direct current power source 10, as represented by the following formula (9).

$$DvFF=(Vo-V[1])/Vo \quad (8)$$

$$DiFF=(Vo-V[2])/Vo \quad (9)$$

The control pulse signals SDa and /SDa shown in FIG. 9 are generated according to the duty ratio Da (Da=Dv). As well, the control pulse signals SDb and /SDb shown in FIG. 10 are generated according to the duty ratio Db (Db=Di).

The control signals SG1 to SG4 for performing the on-off control of the switching elements S1 to S4 are set according to the logical sum of the control pulse signal for the voltage control of the power source PS1 and the control pulse signal for the electric current control of the power source PS2. Namely, the control signals SG1 to SG4 of the switching elements S1 to S4 are set in the same way, irrespective of combination of the voltage control and the electric current control of the direct current power source 10 and the direct current power source 20.

In the parallel connection mode, because the control signals SG2 and SG4 are set to complementary level, the on-off control of the switching elements S2 and S4 are complementarily performed. With this arrangement, it is possible to naturally switch an operation satisfying V [2]>V [1] shown in FIG. 2 and an operation satisfying V [1]>V [2] shown in FIG. 3. In addition, it is possible to perform the direct current power conversion according to the duty ratios Da, Db for each of the power sources PS1, PS2 by complementarily performing the on-off control of switching elements S1, S3 in each operation.

(Control Operation for Reducing Switching Loss in the Parallel Connection Mode)

As described above, when the power converter 50 according to the embodiment of the present invention is operated in the parallel connection mode, PWM control is performed in parallel for each of the direct current power source 10 and the direct current power source 20. Herein, a description will be made on a phase of the carrier signal utilized in the PWM control for the direct current power source 10 and the direct current power source 20.

Figure 15:
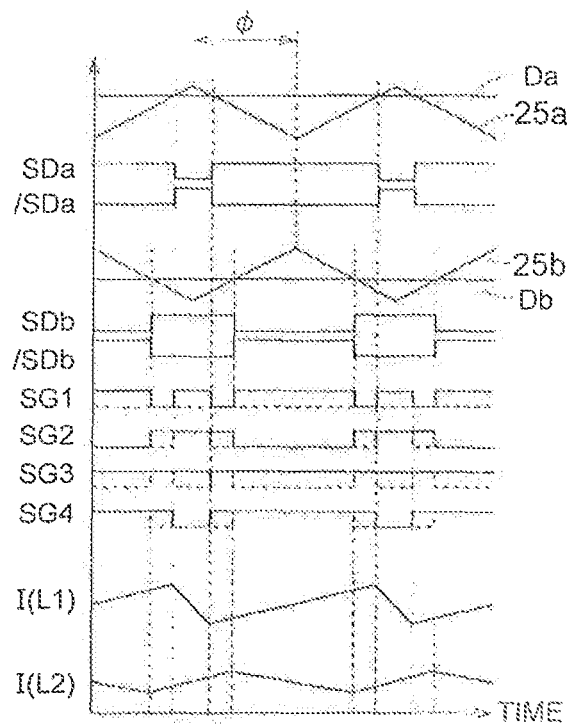
FIG. 15 shows a waveform diagram indicating an example of control operation in the parallel connection mode, when carrier signals having different phases are utilized.

FIG. 14 shows a control operation example in the parallel connection mode, when the carrier signal with same phase is utilized. Meanwhile, FIG. 15 shows a waveform diagram indicating a control operation example in the parallel connection mode, when the carrier signal with different phase is utilized.

With reference to FIG. 14, the carrier signal 25a utilized in the PWM control of the direct current power source 10 has the same frequency and same phase as the carrier signal 25b utilized in the PWM control of the direct current power source 20.

The control pulse signal SDa is generated, according to the duty ratio Da calculated based on the voltage or the electric current of the direct current power source 10, and comparison with the carrier signal 25a. As well, the control pulse signal SDb is obtained, according to the duty ratio Db calculated based on the electric current or the voltage of the direct current power source 20, and comparison with the carrier signal 25b. The control pulse signals /SDa, /SDb are inversion signals of the control pulse signals SDa, SDb.

The control signals SG1 to SG4 are set based on the logical calculation of the control pulse signals SDa (/SDa) and SDb (/SDb), in accordance with logical calculation shown in FIG. 13. It is possible to control the electric current I (L1) flowing through the reactor L1 and the electric current I (L2) flowing through the reactor L2 as shown in FIG. 14 by performing the on-off control of the switching elements S1 to S4 based on the control signals SG1 to SG4. The electric current I (L1) corresponds to the electric current I [1] of the direct current power source 10, while the electric current I (L2) corresponds to the electric current I [2] of the direct current power source 20.

In contrast, in FIG. 15, the carrier signal 25a and the carrier signal 25b have the same frequency with different phase. In the example of FIG. 15, the phase difference φ between the carrier signal 25a and the carrier signal 25b is 180 degrees.

As well as FIG. 14, the control pulse signal SDa is generated according to the comparison of the carrier signal 25a with the duty ratio Da, while the control pulse signal SDb is generated according to the comparison of the carrier signal 25b with the duty ratio Db.

The duty ratios Da, Db shown in FIG. 15 equal to those shown in FIG. 14. Accordingly, the control pulse signal SDa shown in FIG. 15 has the same length of H-level period as the control pulse signal SDa shown in FIG. 14, despite different phase between these signals. As well, the control pulse signal SDb shown in FIG. 15 has the same length of H-level period as the control pulse signal SDb shown in FIG. 14, despite different phase between these signals.

Accordingly, it is possible to achieve the control signals SG1 to SG4 shown in FIG. 15 with waveforms different from the control signals SG1 to SG4 shown in FIG. 14 by giving a phase difference φ between the carrier signals. From the comparison of FIG. 14 with FIG. 15, it is understood that the phase relationship (phase of current) between the electric current I [L1] and the electric current I [L2] can be changed by varying the phase difference φ between the carrier signals 25a, 25b.

Meanwhile, it is understood that an average value of the electric current I (L1), I (L2) is same value both shown in FIG. 14 and FIG. 15, with respect to the same duty ratio of Da, Db. Namely, the output of the direct current power source 10, 20 are controlled according to the duty ratios Da, Db, and not affected by variation in the phase difference φ between the carrier signals 25a, 25b.

Accordingly, the power converter 50 according to the embodiment of the present invention performs carrier phase control for appropriately adjusting the phase difference φ between the carrier signals 25a, 25b, in the parallel connection mode, making it possible to reduce switching losses of the switching elements S1 to S4.

A description will hereinafter be made on a typical example of control in a condition that both of the direct current power sources 10 and 20 are in powering condition, namely in a condition satisfying relations of the electric current I (L1)>0 and the electric current I (L2)>0.

Figure 16:
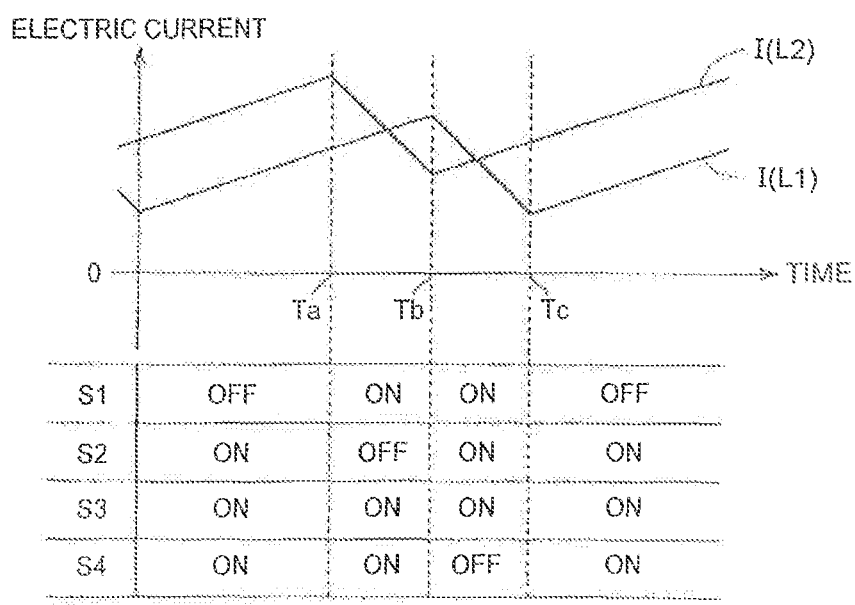
FIG. 16 shows a waveform diagram indicating a phase of current resulting from a carrier phase control according to the first embodiment of the present invention for reducing a switching loss in the parallel connection mode.

FIG. 16 shows a waveform diagram indicating a phase of current according to a phase control in the first embodiment for reducing the switching loss of the power converter 50 in the parallel connection mode.

With reference to FIG. 16, the switching elements S2 to S4 are turned on until the time Ta, and the lower arm of the boost chopper circuit is turned on in the direct current power sources 10, 20. As such, both of the electric current I (L1) and I (L2) increase.

The switching elements S2 is turned off at the time Ta, making it possible to achieve a condition that the lower arm element of the boost chopper circuit for the direct current power source 20 is turned off, and then start the falling in the electric current I (L2). While the switching element S2 is turned off, the switching element S1 is turned on.

After the time Ta, the lower arm element of the boost chopper circuit for the direct current power source 10 is turned on, while the lower arm element of the boost chopper circuit for the direct current power source 20 is turned off. Namely, the electric current I (L2) decreases while the electric current I (L1) increases. In this instance, the electric current path of the power converter 50 is shown in FIG. 17 (a).

Figure 17:
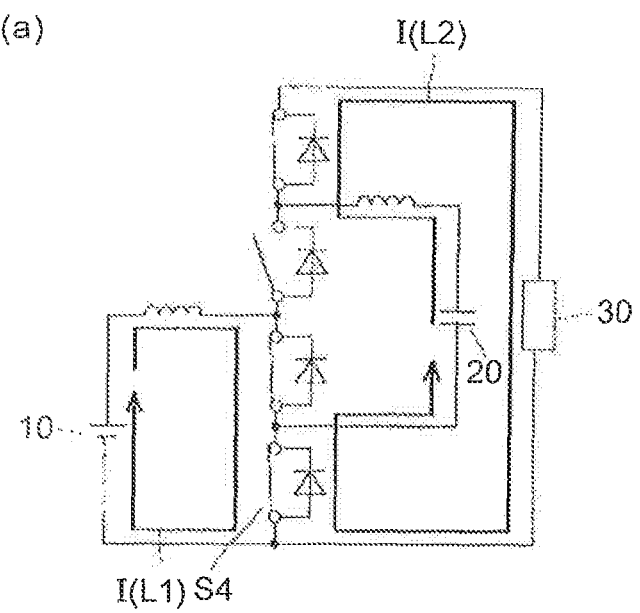
FIG. 17 shows a circuit diagram indicating an electric current path in a predetermined period shown in FIG. 16.
Figure 17:
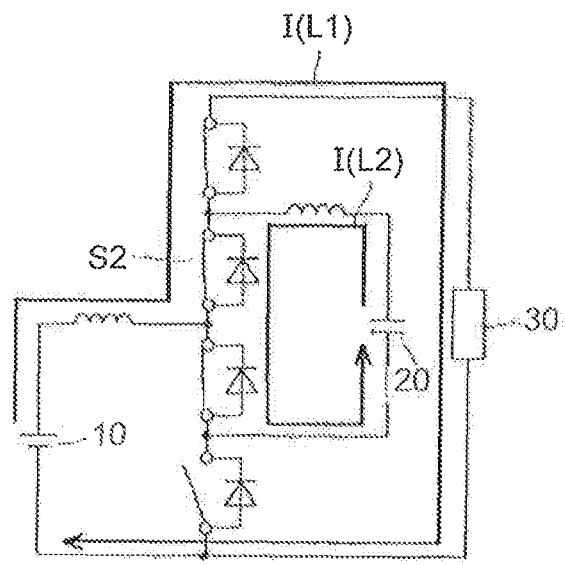

As understood by referring to FIG. 17 (a), after the time Ta, a differential current of the electric currents I (L1) and I (L2) flows through the switching element S4. Namely, the electric current flowing through the switching element S4 decreases.

Reference to FIG. 16 again, when the switching element S4 is turned off, after the time Ta, and the lower arm element of the boost chopper circuit for the direct current power source 10 is turned off, allowing the electric current I (L1)

to start decreasing. When the switching element S2 is turned on, and the lower arm element of the boost chopper circuit for the direct current power source 20 is turned on, allowing the electric current I (L2) to start decreasing again. Namely, the electric current path of the power converter 50 changes from FIG. 17 (a) into FIG. 17 (b). In a condition shown in FIG. 17 (b), the differential current of the electric currents I (L1) and I (L2) flows through the switching element S2 and thereby the electric current flowing through the switching element S2 decreases.

It is possible to reduce the switching loss, namely an electric current during turn-off period of the switching element S4, by turning off the switching element S4 shown in FIG. 17 (a). In addition, it is possible to reduce the switching loss, namely an electric current during turn-on period of the switching element S2, by turning on the switching element S2 shown in FIG. 17 (a).

Accordingly, in the first embodiment, the phase of current, the phase difference φ between the carrier signals 25a, 25b, can be adjusted so as to superimpose the falling initiation timing of the electric current I (L1) (namely, local maximum. Hereinafter, it may be simply referred to as falling timing) on the rising initiation timing of the electric current I (L2) (namely, local minimum. Hereinafter, it may be simply referred to as rising timing.). It enables to turn on the switching element S2 at the time Tb shown in FIG. 16, and turn off the switching element S4.

Referring to FIG. 16 again, the switch element S1 is turned off at the time Tc, while the switching element S4 is turned on. This arrangement enables it to turn on the lower arm element of the boost chopper circuit for the direct current power sources 10, 20, repeating the abovementioned state prior to the time Ta to increase the electric currents I (L1) and I (L2).

Figure 18:
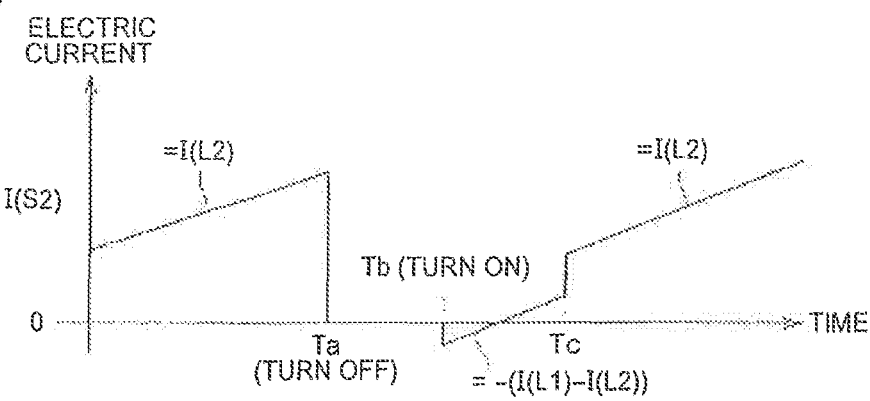
FIG. 18 shows a waveform diagram of an electric current of a switching element under a phase of current shown in FIG. 16.
Figure 18:
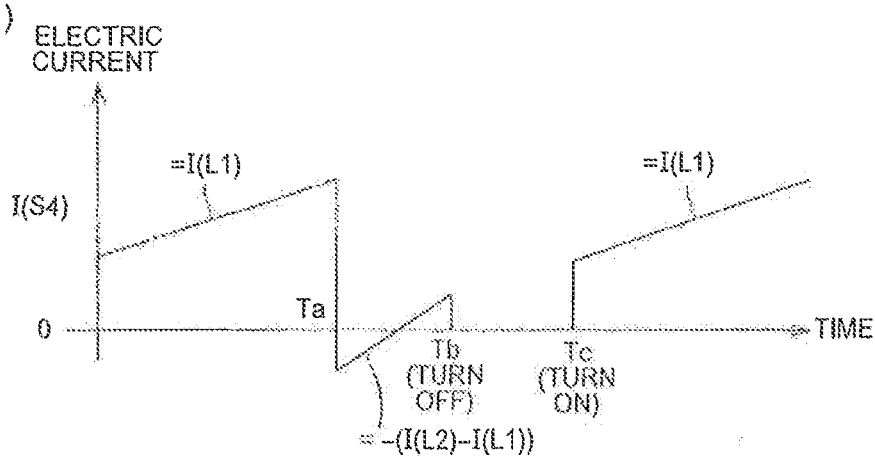

FIG. 18 shows electric current waveforms of the switching elements S2, S4 having phase of current shown in FIG. 16. FIG. 18 (a) shows a waveform of the electric current I (S2) of the switching element S2. FIG. 18 (b) shows a waveform of the electric current I (S4) of the switching element S4.

Referring to FIG. 18 (a), the electric current I (S2) satisfies a relation of I (S2)=I (L2) during the period before the time Ta and after the time Tc. The switching element S2 is turned off during the period from the time Ta to Tb, satisfying an equation of I (S2)=0. During the period from the time Tb to Tc, a relation of I (S2)=−(I (L1)−I (L2)) is satisfied, as shown in FIG. 17 (b).

Referring to FIG. 18 (b), the electric current I (S4) satisfies a relation of I (S4)=I (L1) during the period before the time Ta and after the time Tc. During the period from the time Ta to Tb, a relation of I (S4)=−(I (L2)−I (L1)) is satisfied, as shown in FIG. 17 (a). During the period from the time Tb to Tc, the switching element S4 is turned off, satisfying an equation of I (S4)=0.

Figure 19:
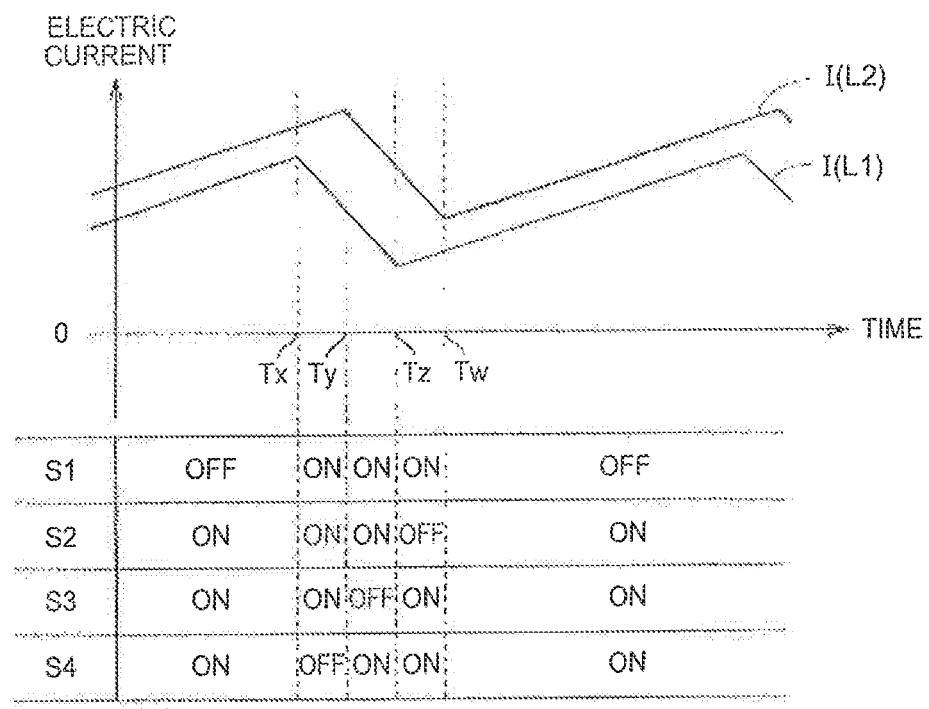
FIG. 19 shows a waveform diagram of a phase of current when a phase difference between carrier signals equals to zero.

FIG. 19 shows a phase of current when the phase difference φ between the carrier signals is set to zero under the same duty ratio as that shown in FIG. 16, for comparison with FIG. 16.

Referring to FIG. 19, when the phase difference φ between the carrier signals 25a, 25b is set to zero, the electric current I (L1) is different from the electric current I (L2) in the rising timing and the falling timing (Tx, Ty, Tz, Tw). Tx, Ty, Tz and Tw are different values.

Specifically, prior to the time Tx, when the switching element S1 is turned off while the switching elements S2-S4 are turned on, both of the electric currents I (L1) and I (L2) increase. Then, the switching element S4 is turned off at the time Tx, starting the falling in the electric current I (L1). The switching element S1 is turned on, when the switching element S4 is turned off.

In addition, the switching element S3 is turned off at the time Tx, starting the falling in the electric current I (L2) at the time Ty. The switching element S4 is turned on, when the switching element S3 is turned off. With this arrangement, both of the electric current I (L1) and I (L2) decrease.

The switching element S2 is turned off at the time Tz, while the switching element S3 is turned on. With this arrangement, the lower arm element of the boost chopper circuit is turned on for the direct current power source 10, repeating the rising of the electric current I (L1). Besides, the switching element S1 is turned off at the time Tw, while the switching element S2 is turned on. As such, the state prior to the time Tx can be achieved to increase both of the electric current I (L1) and I (L2).

Figure 20:
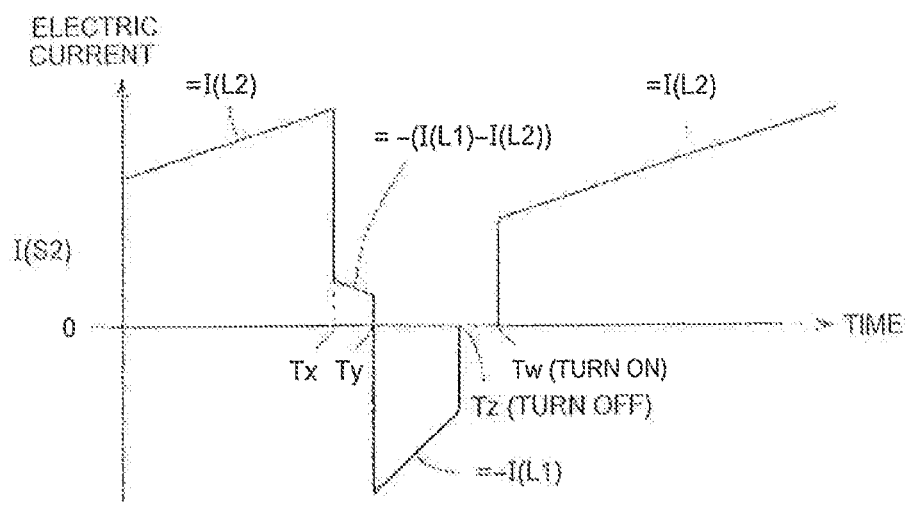
FIG. 20 shows a waveform diagram of an electric current of a switching element under a phase of current shown in FIG. 19.
Figure 20:
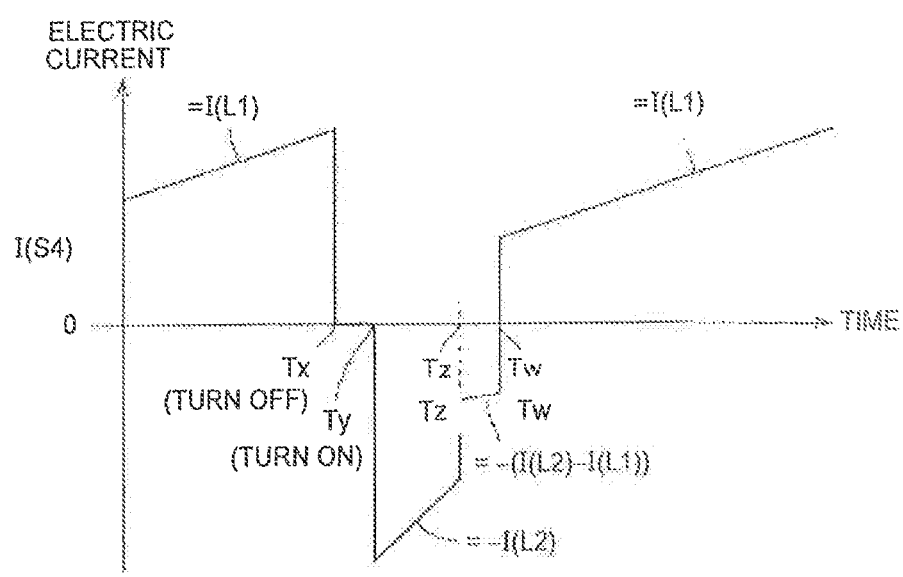

FIG. 20 shows the electric current waveforms of the switching elements S2, S4 under the phase of current shown in FIG. 19. FIG. 20 (a) shows a waveform of the electric current I (S2) of the switching element S2. FIG. 20 (b) shows a waveform of the electric current I (S4) of the switching element S4.

Referring to FIG. 20 (a), the electric current I (S2) satisfies a relation of I (S2)=I (L2) during the period before the time Tx and after the time Tw. During the period from the time Tx to Ty, it is possible to form the same electric current path as that shown in FIG. 17 (b), and satisfy the relation of I (S2)=−(I (L1)−I (L2)). During the period from the time Ty to Tz, it is possible to operate as the upper arm element for the direct current power source 10, and satisfy the relation of I (S2)=−I (L1). During the period from the time Ty to Tz in which both of the electric current I (L1) and I (L2) decrease, the switching element S2 operates as the upper arm element for the direct current power source 10, satisfying the relation of I (S2)=−I (L1). During the period from the time Tz to Tw, the switching element S2 is turned off, satisfying the relation of I (S2)=0.

Referring to FIG. 20 (b), the electric current I (S4) satisfies the relation of I (S4)=I (L1) during the period before the time Tx and after the time Tw. During the period from the time Tx to Ty, the switching element S4 is turned off, satisfying the relation of I (S4)=0. During the period from the time Ty to Tz in which both of the electric current I (L1) and I (L2) decrease, the switching element S4 operates as the upper arm element for the direct current power source 20, satisfying the relation of I (S4)=−I (L2). During the period from the time Tz to Tw, it is possible to form the same electric current path as that shown in FIG. 17 (a) for satisfying the relation of I (S2)=−(I (L2)−I (L1)).

From the comparison of the electric current I (S2) generated at the time Tb shown in FIG. 18 (a) with the electric current I (S2) generated at the time Tw shown in FIG. 20 (a), it is understood that it is possible to reduce the turn-on electric current of the switching element S2, that is, the switching loss during turn-on period with the adjustment in the phase difference φ for achieving the phase of current shown in FIG. 16. From the comparison of the electric current I (S2) during the period from the time Tb to Tc shown in FIG. 18 (a) with the electric current I (S2) during the period from the time Ty to Tz shown in FIG. 20 (a), it is understood that it is possible also to reduce the conduction loss of the switching element S2.

As well, from the comparison of the electric current I (S4) generated at the time Tb shown in FIG. 18 (b) with the electric current I (S2) generated at the time Tx shown in FIG. 20 (b), it is understood that it is possible to reduce the turn-off electric current of the switching element S4, that is, the switching loss during turn-off period with the adjustment in the phase difference ϕ for achieving the phase of current shown in FIG. 16. From the comparison of the electric current I (S4) during the period from the time Ta to Tb shown in FIG. 18 (b) with the electric current I (S4) during the period from the time Ty to Tz shown in FIG. 20 (a), it is understood that it is possible also to reduce the conduction loss of the switching element S4.

With the phase difference ϕ provided between the carrier signals 25a, 25b, it is possible to reduce the loss in the switching elements S1 to S4. As shown in FIG. 16, when both of the direct current power sources 10 and 20 are in powering condition, it is possible to suppress the loss in the switching elements S1 to S4 by providing phase difference ϕ so as to superimpose the falling initiation timing of the electric current I (L1) on the rising initiation timing of the electric current I (L2), namely, coincide the turn-on timing of the switching element S2 with the turn-off timing of the switching element S4. As a result, it is possible to perform the direct current power conversion with high efficiency between the direct current power sources 10 and 20 and the power source line PL (load 30). Such a phase difference ϕ allows to superimpose the falling timing (or rising timing) of the control pulse signal SDa on the rising timing (or falling timing) of the control pulse signal SDb.

As understood by referring to FIG. 14 and FIG. 15, the control pulse signals SDa, SDb vary according to the duty ratios Da, Db. Accordingly, it is understood that the phase difference ϕ achieving the phase of current shown in FIG. 16 also varies according to the duty ratios Da, Db. As such, it is possible to obtain the relationship between the duty ratios Da, Db and the phase difference ϕ for reducing the switching loss in advance, and store the relationship as a map (hereinafter may be also referred to as "phase difference map") or a function (hereinafter may be also referred to as "phase difference calculation formula") in the control device 40 in advance.

It is possible to calculate the phase difference ϕ for performing the carrier phase control according to the phase difference map or the phase difference calculation formula based on the duty ratios Da, Db which is calculated under the PWM control for performing the voltage/electric current control of the direct current power source 10, 20 in the parallel connection mode explained by referring to FIG. 8 to FIG. 13. Besides, it is possible to perform the direct current power conversion with high efficiency for suppressing the loss in the switching element S1 to S4 as described above by generating the carrier signals 25a, 25b having the calculated phase difference ϕ to perform the PWM control.

Explanation is made as to the carrier phase control in which the direct current power sources 10, 20 are in powering condition, with reference to FIG. 16 to 20. The same carrier phase control can be made in other conditions.

Figure 21:
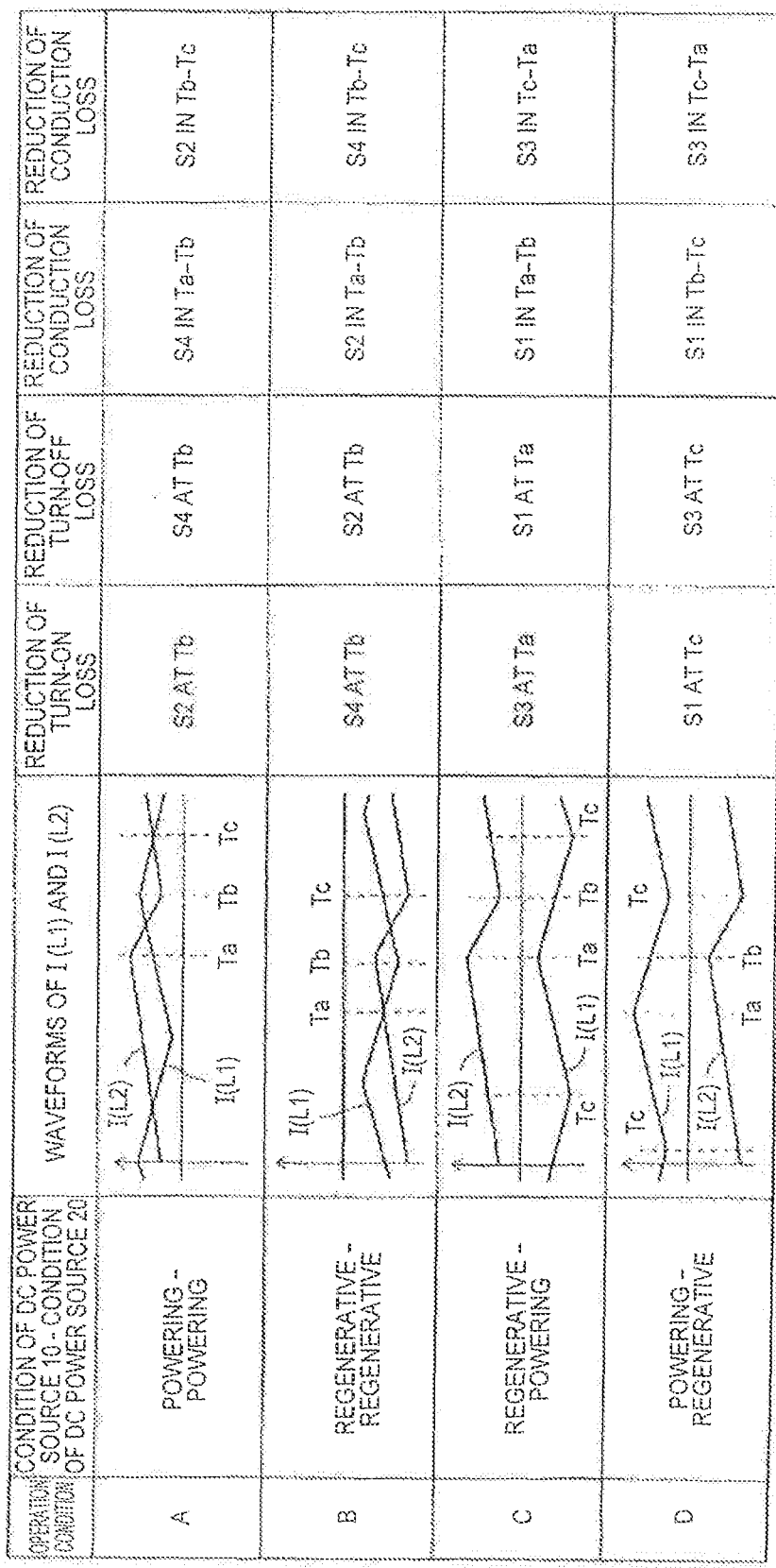
FIG. 21 shows a table indicating a carrier phase control according to the first embodiment of the present invention in each operation condition of the direct current power source.

FIG. 21 shows a table indicating the carrier phase control according to the first embodiment of the present invention in each operation condition of the direct current power source.

Referring to FIG. 21, both of the direct current power sources 10, 20 are in powering condition described above, in condition A. As shown in FIG. 16, the phase difference ϕ of the carrier signals is adjusted to achieve the phase of current so as to superimpose the falling timing of the electric current I (L1) on the rising timing of the electric current I (L2) at Tb shown in the drawing. With this arrangement, it is possible to reduce the turn-on loss of the switching element S2 as well as the turn-off loss of the switching element S4 at Tb. Moreover, as described above, it is possible to reduce the conduction loss of the switching element S4 during the period from Ta to Tb as well as the conduction loss of the switching element S2 during the period from Tb to Tc.

In condition B, both of the direct current power sources 10, 20 are in regenerative condition. In this condition, the phase difference ϕ of the carrier signals is adjusted to achieve the phase of current so as to superimpose the rising timing of the electric current I (L1) on the falling timing of the electric current I (L2) at Tb shown in the drawing. With this arrangement, it is possible to reduce the turn-on loss of the switching element S4 as well as the turn-off loss of the switching element S2 at Tb. Moreover, as described above, it is possible to reduce the conduction loss of the switching element S2 during the period from Ta to Tb as well as the conduction loss of the switching element S4 during the period from Tb to Tc.

In condition C, the direct current power sources 10 is in regenerative condition, while the direct current power source 20 is in powering condition. In this condition, the phase difference ϕ of the carrier signals is adjusted to achieve the phase of current so as to superimpose the falling timing of the electric current I (L1) on the falling timing of the electric current I (L2) at Ta shown in the drawing. With this arrangement, it is possible to reduce the turn-on loss of the switching element S3 as well as the turn-off loss of the switching element S1 at Ta. Moreover, as described above, it is possible to reduce the conduction loss of the switching element S1 during the period from Ta to Tb as well as the conduction loss of the switching element S3 during the period from Tc to Ta.

In condition D, the direct current power sources 10 is in powering condition, while the direct current power source 20 is in regenerative condition. In this condition, the phase difference ϕ of the carrier signals is adjusted to achieve the phase of current so as to superimpose the rising timing of the electric current I (L1) on the rising timing of the electric current I (L2) at Tc shown in the drawing. With this arrangement, it is possible to reduce the turn-on loss of the switching element S1 as well as the turn-off loss of the switching element S3 at Tc. Moreover, as described above, it is possible to reduce the conduction loss of the switching element S1 during the period from Tb to Tc as well as the conduction loss of the switching element S3 during the period from Tc to Ta.

As described above, the phase difference ϕ for reducing the losses in the switching elements S1 to S4 varies according to the combination of powering/regenerative conditions in the direct current power sources 10, 20. Thereby, it is preferred that the abovementioned phase difference map or phase difference calculation formula is given for each of the combinations of powering/regenerative conditions (conditions A-D in FIG. 21).

As described above, for performing the carrier phase control according to first embodiment with use of the power converter 50 according to this embodiment, the phase difference ϕ of the carrier signals 25a, 25b is adjusted according to operation condition of the power converter 50, specifically duty ratios for performing the electric current/voltage control of the direct current power sources 10, 20, or the duty ratio, and powering/regenerative condition of the direct current power sources 10, 20. In particular, it is possible to perform the direct current power conversion with high efficiency for reducing the loss in the switching elements S1 to S4 according to the variance in the operation condition of the power converter 50, by setting the phase difference ϕ for achieving the phase of current shown in FIG.

21 according to the abovementioned phase difference map or the phase difference calculation formula.

Second Embodiment

As described above, the power converter 50 according to this embodiment enables it to operate while changing over between the parallel connection mode and the series connection mode by performing the control of the switching elements S1 to S4. In second embodiment, explanations are given as to the control operation in the series connection mode of the power converter 50, particularly as to the control for fascinating control calculation.

(Circuit Operation in the Series Connection Mode)

Firstly, referring to FIG. 22 and FIG. 23, descriptions will be made on the circuit operation in the series connection mode of the power converter 50.

Figure 22:
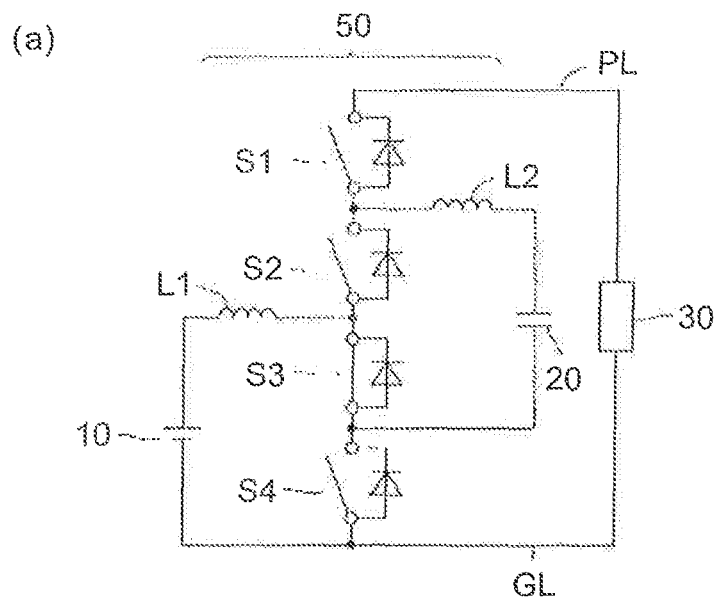
FIG. 22 shows a circuit diagram indicating circuit operation in series connection mode.
Figure 22:
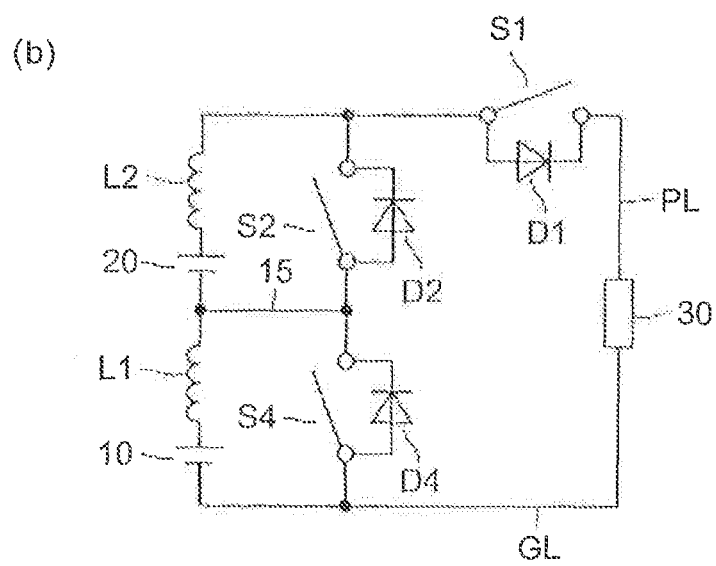

As shown in FIG. 22 (a), it is possible to connect the direct current power sources 10, 20 with the power source line PL in series by locking on switching element S3. FIG. 22 (b) shows the equivalent circuit in this condition.

Referring to FIG. 22 (b), in the series connection mode, it is possible to achieve the on-period and off-period of the lower arm element of the boost chopper circuit alternately between the direct current power sources 10, 20 and the power source line PI which are connected in series, by performing the on-off control commonly to the switching elements S2, S4. The switching element S1 operates as a switch for controlling recharging from the load 30 in response to turn-on operation during off-period of the switching elements S2, S4. The on-locked switching element S3 enables it to equivalently form a line 15 which connects the reactor L1 with the switching element S4.

In the circuit operation shown in FIG. 22, the back-flow path is required for discharging the accumulated energies of the reactors L1, L2, as explained above by referring to FIG. 4 and FIG. 5.

Figure 23:
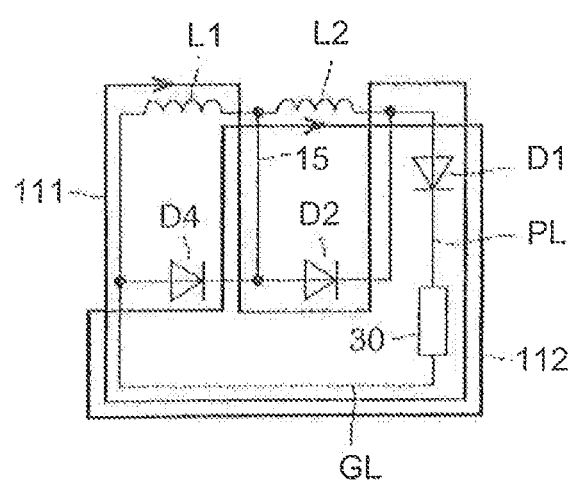
FIG. 23 shows a circuit diagram indicating a back-flow path of a reactor in the circuit operation shown in FIG. 22.
Figure 23:
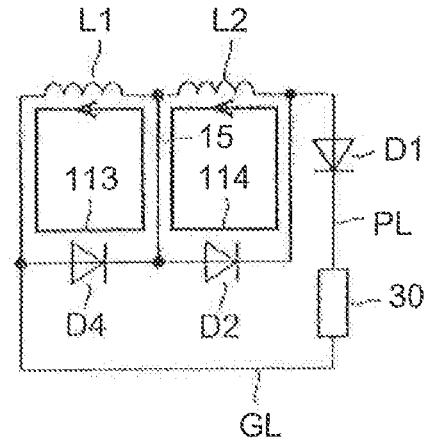

FIG. 23 shows the back-flow path of the reactor in the circuit operation (series connection mode) shown in FIG. 22. FIG. 23 (a) shows the back-flow path in powering condition, and FIG. 23 (b) shows the back-flow path in regenerative condition.

Referring to FIG. 23 (a), in the equivalent circuit shown in FIG. 22 (b), the electric current of the reactor L1 in powering condition is allowed to be flown backwardly via an electric current path 111 passing through the line 15, the diodes D2, D1, the power source line PL, the load 30 and the grounded line GL. The electric current of the reactor L2 in powering condition is allowed to be flown backwardly via an electric current path 112 passing through the diode D1, the power source line PL, the load 30, the diode D4, and the line 15. If switching elements S2, S4 are turned on or turned off simultaneously, the electric current of the reactor L1 equals to that of the reactor L2, not allowing the electric current to flow through the line 15. As a result, the electric current is not allowed to flow through the diodes D2, D4, either.

Referring to FIG. 23 (b), in the equivalent circuit shown in FIG. 22 (b), the electric current of the reactor L1 in regenerative condition is allowed to be flown backwardly via an electric current path 113 passing through the diode D4 and the line 15. At the same time, the electric current of the reactor L2 in regenerative condition is allowed to be flown backwardly via an electric current path 114 passing through the diode D2 and the line 15. If switching elements S2, S4 are turned on or turned off simultaneously, the electric current of the reactor L1 equals to that of the reactor L2, thereby the electric current of the diode D2 equals to that of the diode D4. As a result, the electric current is not allowed to flow through the line 15.

As such, the power converter 50 is securely provided with the back-flow path for discharging the accumulated energies of the reactors L1, L2 in both of powering condition and regenerative condition for operation in the series connection mode.

Next, descriptions will be made on the direct current power conversion (boost operation) in the series connection mode, with reference to FIG. 24.

Figure 24:
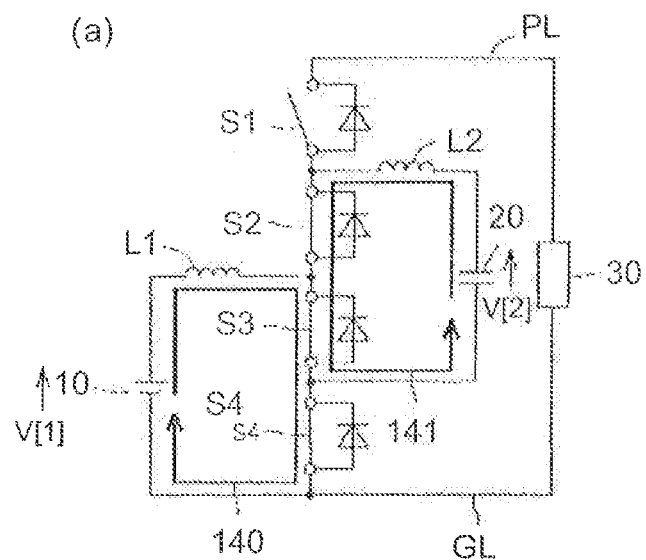
FIG. 24 shows a circuit diagram indicating direct current power conversion (boost operation) in the series connection mode.
Figure 24:
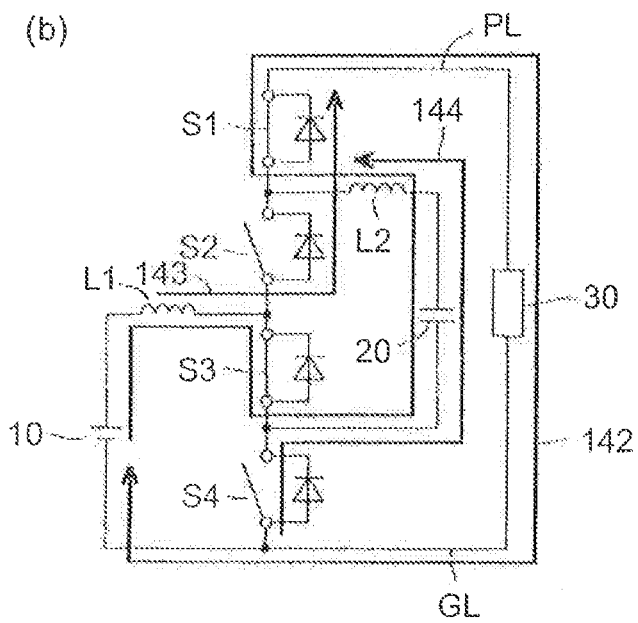

Referring to FIG. 24 (a), the switching element S3 is locked on for connecting the direct current power sources 10, 20 in series, while a pair of the switching elements S2, S4 are turned on and the switching element S1 is turned off. As such, the electric current path 140, 141 are formed to accumulate energies in the reactors L1, L2. As a result, it is possible to achieve on-condition of the lower arm element of the boost chopper circuit for the direct current power sources 10, 20 which are connected in series.

Meanwhile, referring to FIG. 24 (b), while the switching element S3 is locked on, contrary to FIG. 24 (a), a pair of the switching elements S2, S4 are turned off and the switching element S1 is turned on. As such, it is possible to form the electric current path 142. The electric current path 142 allows to output the total of energies from the direct current power sources 10, 20 connected in series and energies accumulated in the reactors L1, L2, to the power source line PL. As a result, it is possible to achieve on-condition of the upper arm element of the boost chopper circuit for the direct current power sources 10, 20 connected in series.

It is possible to form the electric current paths 140, 141 shown in FIG. 24 (a) and the electric current path 142 shown in FIG. 24 (b) alternately, by alternately repeating the first period in which a pair of the switching elements S2, S4 are turned on while the switching element S1 is turned off and the second period in which the switching element S1 is turned on while a pair of the switching elements S2, S4 are turned off, when the switching element S3 is locked on.

In the direct current power conversion in the series connection mode, the relationship can be represented by the following formula (10) among the voltage V [1] of the direct current power source 10, the voltage V [2] of the direct current power source 20, and the output voltage Vo of the power source line PI. In the formula (10), Dc refers to the duty ratio during the first period in which a pair of the switching elements S2, S4 is turned on.

$$Vo=1/(1-Dc)\cdot(V[1]+V[2]) \quad (10)$$

But, the electric current values of the reactors L1, L2 are different at the end of the operation shown in FIG. 24 (a), if V [1] and V [2] are different, and/or if inductances of the reactors L1, L2 are different. Accordingly, just after transition to the operation shown in FIG. 24 (b), a differential electric current will flow via the electric current path 143 if the electric current of the reactor L1 is larger. Meanwhile, the differential current will flow via the electric current path 144 if the electric current of the reactor L2 is larger.

(Basis Control Operation in the Series Connection Mode)

Next, descriptions will be made on the control operation of the power converter 50 in the series connection mode. The control operation described below can be achieved by hardware processing and/or software processing of the control device 40.

Figure 25:
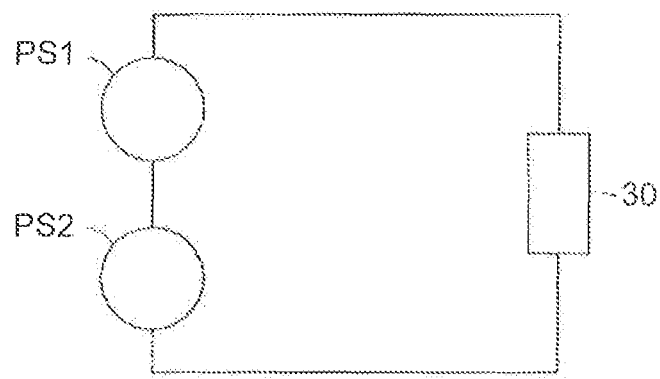
FIG. 25 shows a block diagram indicating an equivalent circuit viewed from a load side in the series connection mode.

FIG. 25 shows an equivalent circuit viewed from the load side in the series connection mode. Referring to FIG. 25, in the series connection mode, the power source PS1 and the power source PS2 are connected to each other in series for the load 30. Thereby, the electric currents flowing through the power source PS1 and PS2 are equal. Accordingly, it is necessary to perform voltage control commonly to the power sources PS1 and PS2 for controlling the output voltage Vo.

The power sources PS1 and PS2 connected in series correspond to the boost chopper circuit for performing the direct current power conversion shown in FIG. 24. Namely, the power sources PS1, PS2 have direct current power conversion functions based on the voltage conversion ratio expressed by the formula (10) between the total of the voltages V [1] and V [2] of the direct current power sources 10, 20 and the output voltage Vo.

In the series connection mode, it is not possible to directly control a power P [1] of the direct current power source 10 and a power P [2] of the direct current power source 20. The power P [1] and voltage V [1] of the direct current power source 10, and the power P [2] and voltage V [2] of the direct current power source 20 satisfy the following formula (11). The total of the power P [1] and the power P [2] equals to the power Po of the load 30 (Po=P [1]+P [2]) as in the parallel connection mode.

$$P[1]:P[2]=V[1]:V[2] \tag{11}$$

Figure 26:
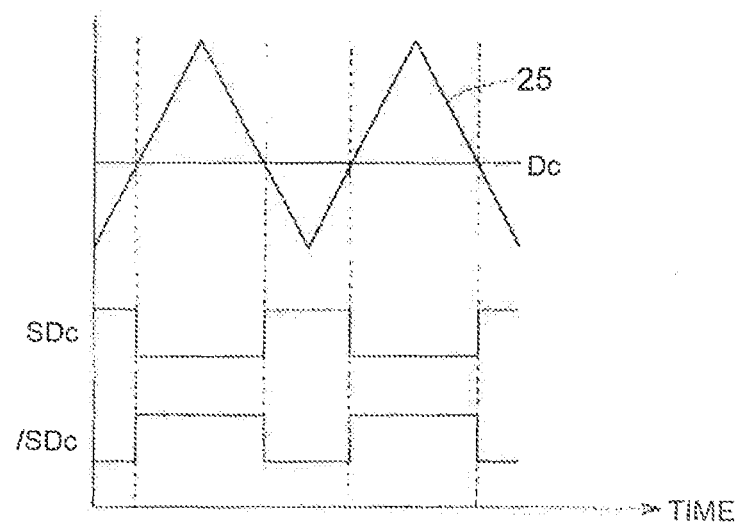
FIG. 26 shows a waveform diagram indicating an example of control operation in the series connection mode.

Referring to FIG. 26, the duty ratio Dc (see formula (10)) commonly applied to the power sources PS1, PS2 is calculated by the voltage feedback control (FIG. 27) for operating as a voltage source. In FIG. 26, the voltage signals representing the duty ratio Dc are referred to as the same symbol, Dc.

The control pulse signal SDc is generated based on the duty ratio Dc (see formula (10) by the same PWM control as that in FIG. 9 and FIG. 10. The control pulse signal /SDc is an inversion signal of the control pulse signal SDc. The duty of the control pulse signal SDc is the same as the duty ratio Dc, while the duty of the control pulse signal /SDc is the same as (1−Dc).

The control pulse signal SDc corresponds to the signal for controlling on-off of the lower arm element of the boost chopper circuit shown in FIG. 24. Meanwhile, the control pulse signal /SDc corresponds to the signal for controlling on-off of the upper arm element of the boost chopper circuit shown in FIG. 24.

Figure 27:
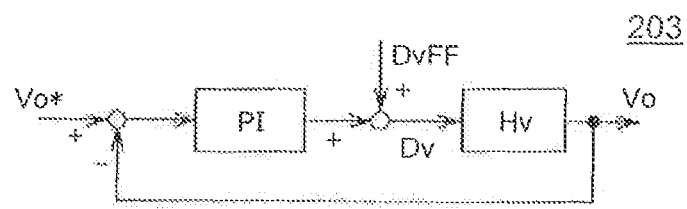
FIG. 27 shows an example of configuration of a control block of the power source in the series connection mode.

FIG. 27 shows a configuration example of a control block 203 in the series connection mode. Referring to FIG. 27, the control block 203 generates a duty ratio command value Dv for voltage control in accordance with the total of the feedback control amount which is obtained by PI (proportional integration) calculation of deviation of the voltage command value Vo* of the output voltage Vo and the output voltage Vo and the feed forward control amount DvFF. The transfer function Hv corresponds to transfer functions of the power sources PS1, PS2 connected in series.

FIG. 28 shows setting of each control data in the series connection mode. Referring to FIG. 28, the duty ratio command value Dv for voltage control shown in FIG. 27 is utilized in the duty ratio Dc. The voltage controlled by voltage control is the output voltage Vo. The transfer function Hv shown in FIG. 27 corresponds to the transfer function of the boost chopper circuit shown in FIG. 24. Besides, the feedforward control amount DvFF is set according to the voltage difference between the voltage of the power sources connected in series represented by V [1]+V [2] and the output voltage Vo, as shown in the following formula (12).

$$DvFF=(Vo-(V[2]+V[1]))/Vo \tag{12}$$

The control pulse signals SDc and /SDc shown in FIG. 26 are generated according to the duty ratio Dc (Dc=Dv).

The control signals SG1-SG4 for respectively controlling on-off switching of the switching elements S1-S4 are set according to the control pulse signals SDc and /SDc so as to control the boost chopper circuit shown in FIG. 24.

In the series connection mode, the direct current power sources 10 and 20 are connected to each other in series by locking on the switching element S3. Thereby, the control signal SG3 is fixed to H level.

The switching element S1 forms the upper arm element of the boost chopper circuit shown in FIG. 24. Thereby, the control pulse signal /SDc is utilized as the control signal SG1. The switching elements S2, S4 form the lower arm elements of the boost chopper circuit shown in FIG. 24. Thereby, the control pulse signal SDc is utilized as the control signals SG2, SG4.

(Efficient Control Operation in the Series Connection Mode)

As described above, the power converter 50 can select the series connection mode and the parallel connection mode. As described in the first embodiment, in the parallel connection mode, the powers of the direct current power sources 10, 20 can be individually controlled. Meanwhile, in the series connection mode, the boost ratio (voltage conversion ratio) is lower than that in the parallel connection mode, thereby the efficiency is expected to increase. Accordingly, in case of Vo*>(V [1]+V [2]), the parallel connection mode is preferably directed to be switched into the series connection mode.

FIG. 29 shows the comparison of the control signals SG1-SG4 in the parallel connection mode described above with the control signals SG1-SG4 in the series connection mode. As described above, in the parallel connection mode, the control signals SG1-SG4 are generated by logical calculation based on the duty ratios Da, Db for controlling voltage conversion ratio of voltage V [1] or V [2] to the output voltage Vo. Meanwhile, in the series connection mode, the control signals SG1-SG4 are generated by logical calculation based on the duty ratio Dc for controlling voltage conversion ratio of voltage V [1]+V [2] to the output voltage Vo.

As described above, according to FIG. 29, control calculation is required to be performed differently in the parallel connection mode and the series connection mode.

Figure 30:
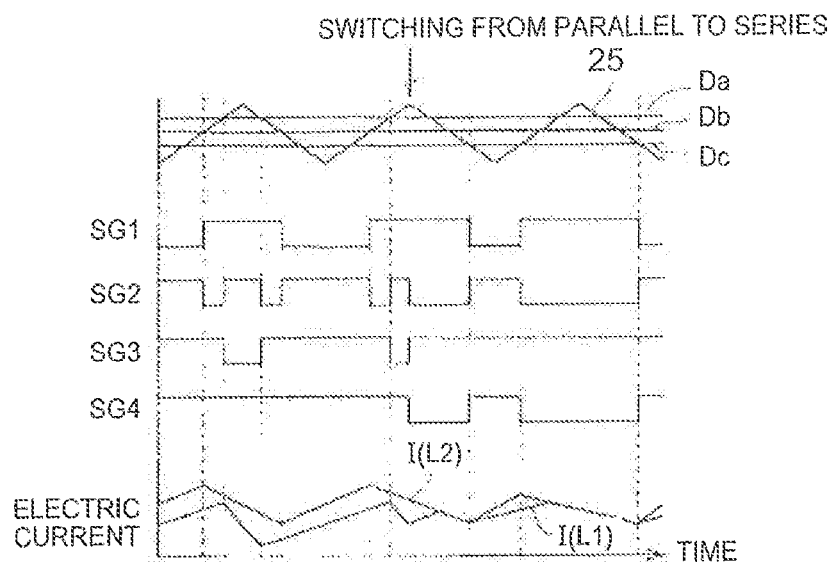
FIG. 30 shows an example of waveform in the first operation for changing over from the parallel connection mode to the series connection mode according to FIG. 29.

FIG. 30 shows the first example of the operation waveform in changing over from the parallel connection mode to the series connection mode according to FIG. 29. FIG. 30 shows an operation when PWM control of the direct current power sources 10 and 20 is performed with the carrier signal 25 having the same phase.

Referring to FIG. 30, in the parallel connection mode, duty ratio Dc is calculated besides the duty ratios Da, Db. As a result, it is possible to generate the control signals SG1-SG4 in accordance with control iii the series connection mode, soon after a command for changing over from the parallel connection mode to the series connection mode is generated at a peak of the carrier signal 25. However, also in the parallel connection mode, the duty ratio Dc not required for the control is calculated in the background, increasing the calculation load on the control device 40. For this reason, there is concern that control precision may be decreased due to the growth in cost of the control device 40 and unavoidable elongation of the control period in view of specification of the control device 40.

Figure 31:
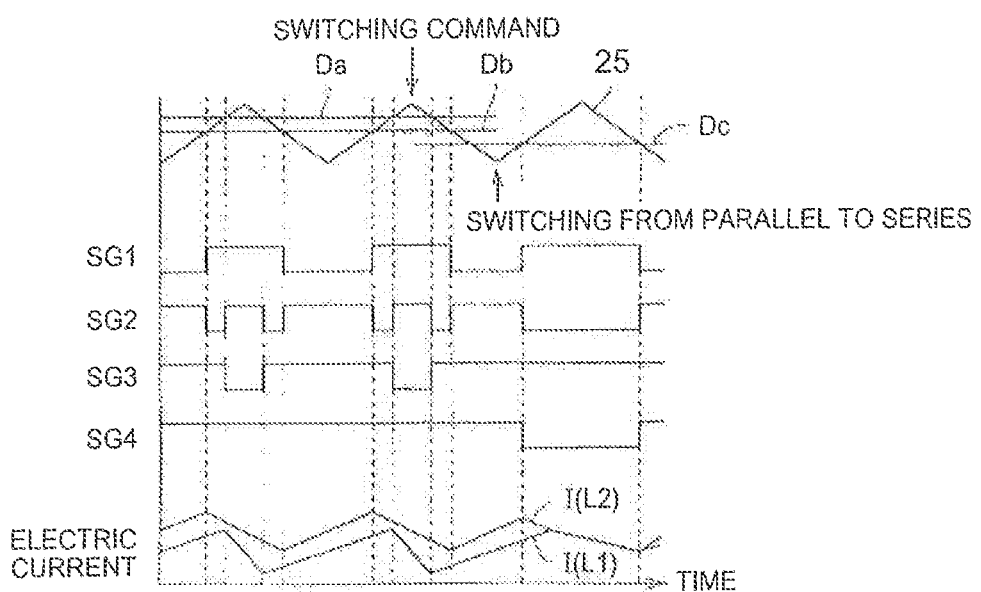
FIG. 31 shows an example of waveform in the second operation for changing over from the parallel connection mode to the series connection mode according to FIG. 29.

FIG. 31 shows a control operation for changing over from the parallel connection mode to the series connection mode without performing the background calculation as that in FIG. 30.

Referring to FIG. 31, the duty ratio Dc is not calculated in the parallel connection mode. The calculation of the duty ratio Dc begins, after the command for changing over from the parallel connection mode to the series connection mode is generated at a peak of the carrier signal 25. Accordingly, the example shown in FIG. 31 is free from such a high calculation load on the control device 40 as the example of the operation waveform in FIG. 30.

However, in the example shown in FIG. 31, it is not possible to start the series connection mode, before the control pulse signal SDc is obtained based on the duty ratio Dc and the PWM control based on the same. For example, as shown in FIG. 31, after the switching command is generated, the delay for a half of the period of the carrier signal 25 is caused before the series connection mode actually initiates. Thereby, there is concern that the control precision may be decreased.

In the second embodiment of the present invention, it is possible to efficiently perform the control operation for mode switching by applying the carrier phase control in the parallel connection mode described in the first embodiment to the series connection mode.

Figure 32:
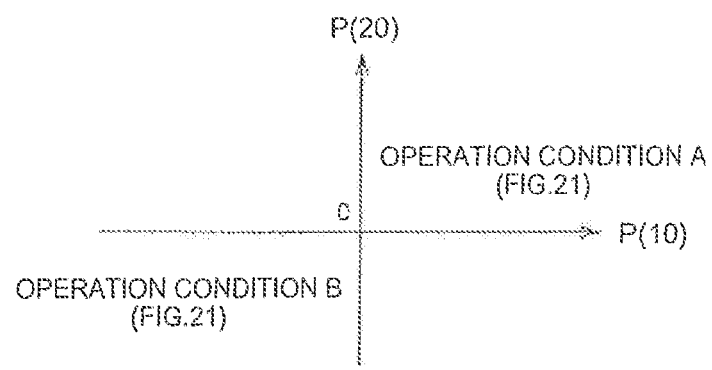
FIG. 32 shows a diagram indicating a condition of the direct current power source in the parallel connection.

As shown in FIG. 32, in the series connection mode, the direct current power sources 10 and 20 are connected to each other in series, generating either of the powering condition in both of the direct current power sources 10 and 20 (condition A in FIG. 21) and the regenerative condition in both of the direct current power sources 10 and 20 (condition B in FIG. 21).

As such, in the control operation according to the second embodiment, as shown in condition A, B in FIG. 21, the phase difference φ between the carrier signals is set so as to superimpose turn-on of the switching element S2 on turn-off of the switching element S4, or superimpose turn-on of the switching element S4 on turn-off of the switching element S2.

Figure 33:
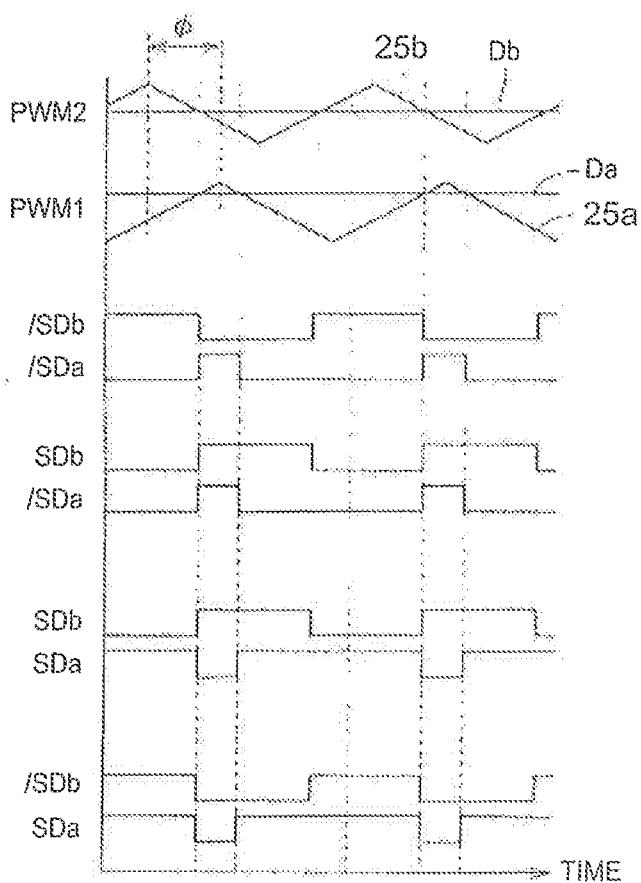
FIG. 33 shows a waveform diagram indicating a control pulse signal when applying a carrier phase control according to the first embodiment.

It is possible to superimpose the falling timing of the control pulse signal SDa on the rising timing of the control pulse signal SDb by setting the phase difference φ in this manner, as shown in FIG. 33, or superimpose the rising timing of the control pulse signal SDa on the falling timing of the control pulse signal SDb. As such, it is possible to achieve the phase of current shown in conditions A, B in FIG. 21.

The duty ratios Da, Db in this condition will be considered. Da is expressed by the following formula (13) by modifying formula (2).

$$Da=(Vo-V[1])/Vo \quad (13)$$

As well, Db is expressed by the following formula (14) by modifying the formula (3).

$$Db=(Vo-V[2])/Vo \quad (14)$$

As shown in FIG. 29, the control signal SG3 in the parallel connection mode is generated based on the logical sum of the control pulse signals SDa and SDb. Thereby, it is understood that the ratio of H level period of the control signal SG3 in the parallel connection mode is more than 1.0, when the phase difference φ is set so as to superimpose the falling (or rising) timing of the control pulse signal SDa on the rising (or falling) timing of the control pulse signal SDb, if satisfying Vo>(V[1]+V[2]). Namely, when satisfying Vo>(V[1]+V[2]), the control signal SG3 is locked to H level also by the PWM control commonly applied to the parallel connection mode with duty ratios Da, Db.

As shown in FIG. 29, the control signal SG1 in the parallel connection mode is generated based on the logical sum of the control pulse signals /SDa, and /SDb. Referring to FIG. 33, when the phase difference φ is set according to the first embodiment, it is possible to superimpose the rising timing of the control pulse signal /SDa on the rising timing of the control pulse signal /SDb. Thereby, the duty ratio HD1 of the control signal SG1 is expressed by DSG1=(1−Da)+(1−Db). Namely, DSG1 is expressed by the following formula (15).

$$DSG1=(V[1]+V[2])/Vo \quad (15)$$

Meanwhile, the duly ratio Dc is expressed by the following formula (16) by modifying the formula (2).

$$Dc=1-(V[1]+V[2])/Vo \quad (16)$$

Accordingly, when satisfying SG1=/SGc in accordance with logical calculation in the series connection mode in FIG. 29, the duty DSG1 of the control signal SG1 is expressed by the following formula (17).

$$DSG1=1-Dc=(V[1]+V[2])/Vo \quad (17)$$

As described above, when the phase difference φ is set in accordance with the carrier phase control in the first embodiment, it is possible to generate signals with a duly ratio equal to that of the control pulse signal /SDc based on the duty ratio Dc by performing logical calculation based on the control pulse signals SDa, SDb with duty ratios Da, Db, specifically logical sum of /SDa and /SDb. Namely, it is possible to generate the control signal SG1 in the series connection mode based on the control pulse signals SDa. SDb.

As shown in FIG. 29, the control signals SG2, SG4 in the series connection mode are inversion signals of the control signal SG1. The result of logical calculation of not (/SDb or /SDa) is the logical product (SDb and SDa). Accordingly, it is possible to generate the control signals SG2, SG4 which are required to be set according to the control pulse signal SDc, based on the logical calculation of the control pulse signals SDa and SDb.

As described above, it is possible to generate the control signals SG1-SG4 which are required to be set based on the duty ratio Dc in the series connection mode, according to the control pulse signals SDa, SDb based on the duty ratios Da, Db, as shown in FIG. 34, when the phase difference φ between the carrier signals is set so as to superimpose an edge of the control pulse signal SDa (/SDa) on the edge of the control pulse signal SDb (/SDb).

Specifically, as described above, the control signal SG3 is a signal which is fixed to H level by the logical sum of the control pulse signals SDa and SDb. Besides, the control signal SG1 can be generated by logical sum of the control pulse signals /SDa, and/SDb so as to have a duty equivalent to the PWM control based on the duty ratio Dc. In addition, in the series connection mode, it is possible to generate the control signals SG2, SG4 which is set complementarily to the control signal SG1, based on the logical sum of the control pulse signals SDa and SDb.

Figure 35:
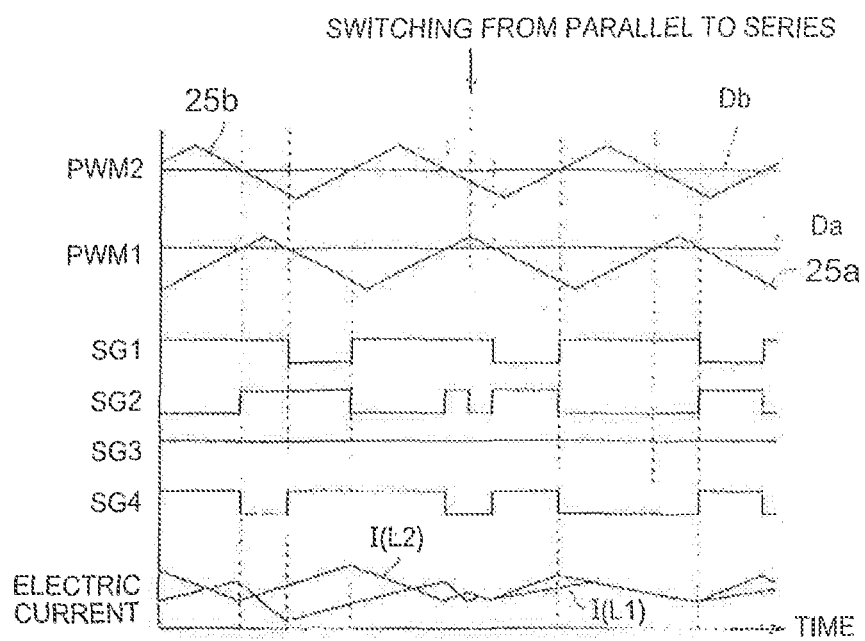
FIG. 35 shows a waveform diagram indicating an operation example for changing over from the parallel connection mode into the series connection mode according to the second embodiment.

FIG. 35 shows an example of operation waveform when changing over from the parallel connection mode according to second embodiment to the series connection mode.

Referring to FIG. 35, it is possible to generate the control signals SG1-SG4 in the series connection mode based on the duty ratios Da, Db without calculating the duty ratio Dc by logical calculation according to FIG. 34.

Accordingly, even if the switching command for changing over from the parallel connection mode to the series connection mode at a peak of the carrier signal 25a is generated at a peak of the carrier signal 25, for example, it is possible to immediately generate the control signals SG1-SG4 in the series connection mode based on the duty ratios Da, Db which are calculated in the parallel connection mode.

In view of this arrangement, it is possible to perform changing over from the parallel connection mode to the series connection mode, without causing the growth in the calculation load of the control device 40 in the parallel connection mode explained above by referring to FIG. 30 as well as the delay in control explained above by referring to FIG. 31.

As described above, according to the second embodiment of the present invention, it is possible to generate the control signals SG1-SG4 based on the duty ratio Dc from the control pulse signals SDa (/SDa), SDb (/SDb) by setting the phase difference φ between the carrier signals by means of the same carrier phase control as that in the first embodiment. Namely, it is possible to perform switching between the parallel connection mode and the series connection mode only by switching the logical calculation based on the common control pulse signals SDa (/SDa), SDb (/SDb), as shown in FIG. 34.

Third Embodiment

In third embodiment, descriptions will be made on a configuration example of a power source system of an electric vehicle to which the power source system 5 according to first and second embodiment is specifically applied, as well as operation of the same.

Figure 36:
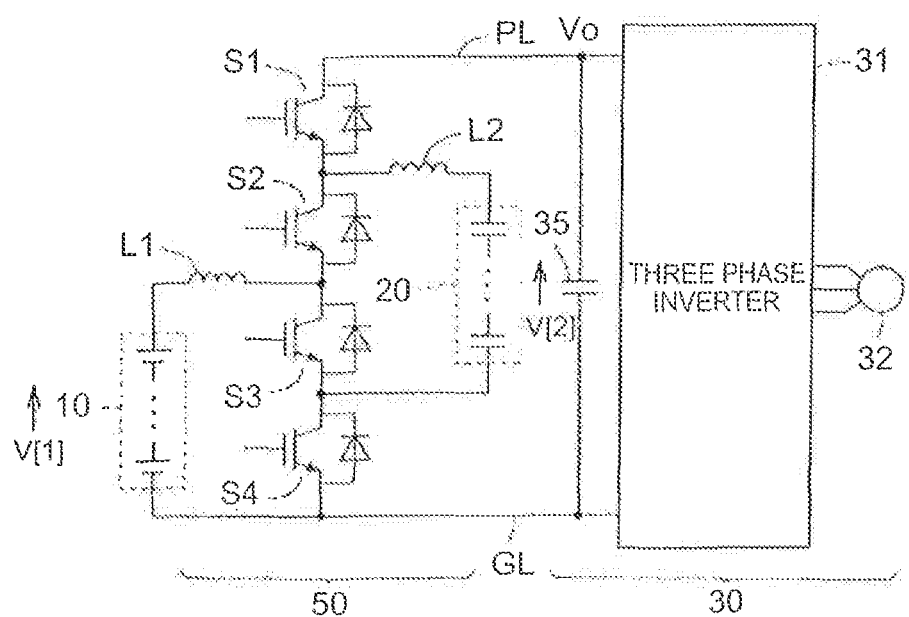
FIG. 36 shows a circuit diagram indicating a configuration example of a vehicle power source system to which the power source system according to the embodiment of the present invention is applied.

FIG. 36 shows a circuit diagram indicating a configuration example of the vehicle power source system to which the power source system according to the embodiment of the present invention is applied.

With reference to FIG. 36, an assembled battery formed of series-connected plural secondary battery cells is utilized as the direct current power source 10. In addition, series-connected plural electric double layer capacitors are utilized as the direct current power source 20. A smoothing condenser 35 is provided between the ground line GL and the power source line PL through which the direct voltage is output from the power converter 50.

The load 30 includes a three-phase inverter 31 for converting the direct current voltage Vo on the power source line PL into the three-phase alternating voltage, and a motor generator 32 which operates in response to the three-phase alternating current power from the three-phase inverter 31. For example, the motor generator 32 is formed of a drive motor mounted on electric car, hybrid car and the like. Namely, the motor generator 32 performs regenerative power generation during deceleration of electric car, hybrid car and the like. During operation for power generation of the motor generator 32, the three-phase inverter 31 outputs to the power source line PL after converting the three-phase alternating current power generated with the motor generator 32 into direct current power. It is possible to recharge the direct current power source 10 and/or the direct current power source 20 with this direct current power.

In the example of system configuration shown in FIG. 36, it is preferred that the direct current power source 10 formed of secondary battery is utilized as a steady power supplier while the direct current power source 10 formed of electric double layer capacitor is utilized as an auxiliary power supplier. In the parallel connection mode, the power of the direct current power source 10 is controlled so as to perform the electric current control of the direct current power source 10 for prevention of over-charging or over-discharging of the secondary battery. Meanwhile, the voltage control of the direct current power source 20 is performed.

In the parallel connection mode, it is possible to control the output voltage Vo in accordance with the voltage command value Vo*, as well as supply and receive power to the load 30 from the direct current power sources 10 and 20 in parallel. In this configuration, it is possible to supply an energy required for the load 30 even when it is difficult to securely output from the direct current power source (at extremely low temperature, for example). It is possible to precisely manage powers of the direct current power sources 10, 20 individually, as the powers of the direct current power sources 10, 20 can be individually controlled. Namely, it is possible to use each of the direct current power sources 10, 20 more safely. It is also possible to supply and receive power between the direct current power sources 10, 20, as the direct current power sources 10 and 20 can be individually controlled. As a result, it is also possible to pre-charge one of the direct current power sources 10, 20 with the other power source via the power source line PL, prior to operation of the load 30, for example.

Although illustration is not given, it is possible to maintain the power P [1] recharged in the direct current power source 10 at a constant value by the electric current control, as well as perform power distribution control for supplying the remaining power to the direct current power source 20 simultaneously with the control of the output voltage Vo, even under the regenerative condition in which the load 30 (motor generator 32) operates for power generation.

Meanwhile, in the series connection mode, the electric current flowing through the switching elements S1 to S4 within the power converter 50 decreases to be lower than that in the parallel connection mode, if the power Po of the load 30 is the same, for the following reason: the total of the electric current resulting from the direct current power conversion for the voltage V [1] and the electric current resulting from the direct current power conversion for the voltage V [2] flows through each of the switching elements in the parallel connection mode, while the direct current power conversion is performed for the voltage V [1]+V[2] resulting from the series connection in the series connection mode. Accordingly, in the series connection mode, it is possible to improve efficiency by reducing the power loss in the switching elements. Besides, in the series connection mode, it is possible to control the output voltage Vo without being affected by variance in the voltages V [1], V [2] caused by power delivering between the load 30 and the direct current power sources 10, 20.

In the parallel connection mode, duty ratios Da, Db are set according to the ratio of the output voltage Vo to the voltage V [1], V [2], and thereby may be nearly equal to 1.0 when the voltage in one of the direct current power sources decreases. Accordingly, H level period ratio in any of the control signals SG1-SG4 may be nearly 1.0. As it is necessary to provide dead time for securely preventing the upper arm element and the lower arm element from turning on simultaneously for the control of real boost chopper circuit, achievable duty ratios Da, Db have upper limits. Accordingly, only in the parallel connection mode, it is not possible to perform voltage control when the voltage in one of the direct current power sources decreases to some extent. Namely, there is a certain limit in the parallel connection mode, in which the energies accumulated in the direct current power sources 10, 20 are exhausted.

Meanwhile, the duty ratio Dc in the series connection mode is set according to the ratio of the output voltage Vo to the voltage V [1]+V [2]. Thereby, the voltage in one of the direct current power sources may be decreased, but is not seriously decreased. As such, it is possible to continue the voltage control even when the voltage in one of the direct current power sources is decreased to some extent, contrary to the case in the parallel connection mode. As a result, the series connection mode is more advantageous than the parallel connection mode in which the direct current power sources 10, 20 are connected in series to exhaust the energies accumulated in the direct current power sources 10, 20.

In the series connection mode to which second embodiment is applied, the duty ratio Dc is not calculated. But, it is possible to actually control on-off switching of the switching elements S1-S4 according to the duty ratio Dc based on the control pulse signals SDa, SDb. Thereby, the abovementioned features are applied commonly.

As described above, it is possible to separately use a mode for connecting two direct current power sources 10, 20 in parallel and a mode for connecting the same in series, according to the controls of the plural switching elements S1-S4, in the power source system (vehicle power source system) according to third embodiment. As a result, in the power source system of the electric vehicle, it is possible to separately use the parallel connection mode for improving the compatibility to the load power (supply of the consumption power and acceptance of generated power) as well as power management performance, and the series connection mode for achieving superior efficiency and usability of the accumulated energy. Accordingly, it is possible to extend drive distance of the electric vehicle with respect to the same accumulated power by effectively utilizing two direct current power sources 10, 20.

In particular, when the carrier phase control according to first and second embodiments is applied, the switching between the parallel connection mode and the series connection mode is automatically made according to the relationship between the output voltage Vo and the voltage V [1], V [2]. Specifically, the series connection mode is automatically applied when a relation of Vo>V [1], V [2] is satisfied.

In this embodiment, descriptions are made as to examples of application of different types of the direct current power source for the direct current power source 10 and the direct current power source 20, typically secondary battery and electric double layer capacitor. In another aspect in which power is supplied to the load with a combination of different types of direct current power source, in particular direct current power sources having different energy densities and power densities (ragone plot), it is possible to compensate for output mutually in weak operation regions for securely provide the load power in broad operation region, particularly in the parallel connection mode.

In addition, when two direct current power sources having different output voltages are combined to each other, the direct current power source is expected to be effectively utilized by performing the switching between the series connection mode and the parallel connection mode. But, description will be made for confirmation that the application of the present invention is not affected even when the direct current power sources 10 and 20 are formed of power sources having the same rated voltage and/or the same type of power sources. For example, when same type of the direct current power sources is utilized as a main power source and an auxiliary power source, it is preferred to configure the power source system of the present invention.

In addition, description will be made for confirmation that the load 30 can be formed of any device if the device operates in response to the controlled direct current voltage Vo. Namely, in this embodiment, explanations are made as to a configuration example in which the load 30 is formed of an inverter and a drive motor mounted on an electric car, a hybrid car and the like, but the application of the present invention is not limited to the above applications.

In addition, the configuration of the power converter 50 is not limited to the example shown in FIG. 1, either. Namely, if at least one of the plurality of switching elements included in the power converter is disposed to be included in both of the power conversion path for the first direct current power source and the power conversion path for the second direct current power source, it is possible to apply the control processing for performing the phase control in first embodiment and the control processing in the series connection mode in second embodiment.

The embodiments of the disclosure should be considered in all aspects as illustrative and not restrictive. The scope of the present invention is not defined by the above description but defined by the appended claims, and all changes which come within the meaning and range of equivalency of the claims are to be embraced within their scope.

INDUSTRIAL APPLICABILITY

The present invention can be applied to a power source system for performing direct current power conversion among two direct current power sources and a load.

DESCRIPTION OF THE REFERENCE NUMERALS 5 power source system, 10, 20 direct current power source, 15 line, 25, 25a, 25b carrier signal, 30 load, 31 inverter, 32 motor generator, 35 smoothing capacitor, 40 control device, 50 power converter, 102-109, 111-114, 120, 121, 130, 131, 140-144 electric current path, 201, 202, 203 control block, D1-D4 anti-parallel diode, DT, Da, Db, Dc duty ratio, Di, Dv duty ratio command value, DiFF, DvFF feedforward control amount, GL grounded line, Hi, Hv transfer function, Ii* electric current command value, Ii electric current, L1, L2 reactor, N1, N2, N3 node, PL power source line, PS1, PS2 power source, S1-S4 semiconductor switching element for power, SDa (/SDa), SDb (/SDb), SDc (/SDc) control pulse signal, SG1-SG4 control signal, V [1], V [2] voltage, Vo output voltage, Vo* voltage command value

The invention claimed is:

1. A power source system comprising;
   a first direct current power source,
   a second direct current power source,
   a power converter comprising a boost chopper circuit,
      wherein the boost chopper circuit is configured to provide a bi-directional current boost and step-down,
      wherein the boost chopper circuit includes a plurality of switching elements for performing direct current power conversion between a power source line electrically connected to a load, and the first and the second direct current power sources, and
   a control device configured to control on-off of the plurality of switching elements in accordance with a pulse width modulation control for controlling an output voltage on the power source line,
   wherein the plurality of switching elements are disposed to be included in both a first power conversion path formed between the first direct current power source and the power source line, and a second power conversion path formed between the second direct current power source and the power source line, wherein the power converter has a first operation mode for performing the direct current power conversion between the first and second direct current power sources and the power source line in parallel, wherein the control device is configured to vary a phase difference between a first carrier signal used for a first pulse width modulation control to control a first power conversion via the first power conversion path, and a second carrier signal used for a second pulse width modulation control to control a second power conversion via the second power conversion path in the first operation mode, according to an operation condition of the power converter, and wherein the control device is configured to generate control signals of on-off of the plurality of switching elements on the basis of a first control pulse signal obtained by the first pulse width modulation control and a second control pulse signal obtained by the second pulse width modulation control.

2. The power source system according to claim 1, wherein the control device is configured to variably set the phase difference between the first carrier signal and the second carrier signal on the basis of duty ratios of the first control pulse signal and the second control pulse signal.

3. The power source system according to claim 2, wherein the control device is configured to variably set the phase difference between the first carrier signal and the second carrier signal, on the basis of a combination of the first direct current power source in either one of a powering condition and a regenerative condition and the second direct current power source in either one of a powering condition and a regenerative condition, and duty ratios of the first control pulse signal and the second control pulse signal.

4. The power source system according to claim 1, wherein the control device is configured to vary the phase difference between the first carrier signal and the second carrier signal to superimpose one of a rising edge and a falling edge of the first control pulse signal on the other of a rising edge and a falling edge of the second control pulse signal.

5. The power source system according to claim 1, wherein the control device is configured to control one of the first and second direct current power conversions to control a voltage ratio of a voltage in either one of the first and second direct current power sources to the output voltage in the first operation mode, and wherein the control device is configured to control the other of the first and second direct current power conversions to control an electric current in the other of the first and second direct current power sources.

6. The power source system according to claim 1, wherein the first control pulse signal is generated on the basis of a comparison of the first carrier signal with a first control amount which is calculated on the basis of either one of a voltage and an electric current of the first direct current power source, and wherein the second control pulse signal is generated on the basis of comparison of the second carrier signal with a second control amount which is calculated on the basis of the other of a voltage and an electric current of the second direct current power source.

7. The power source system according to claim 1, wherein the power converter further includes a second operation mode for performing direct current power conversion while the first and second direct current power sources are electrically connected to the power source line in series, wherein the control device is configured to variably set the phase difference between the first carrier signal and the second carrier signal to superimpose one of a rising edge and a falling edge of the first control pulse signal on the other of a rising edge and a falling edge of the second control pulse signal in the second operation mode, and wherein the control device is configured to generate the control signals of the plurality of switching elements on the basis of a logical calculation of the first control pulse signal and the second control pulse signal.

8. The power source system according to claim 7, wherein the control device is configured to generate the control signal of a portion of the plurality of switching elements from the first control pulse and the second control pulse signal in accordance with a common logical calculation between the first operation mode and the second operation mode in each of the corresponding switching elements, and wherein the control device is configured to generate the control signal of a remaining switching element from the first control pulse signal and the second control pulse signal in accordance with a logical calculation different between the first operation mode and the second operation mode in the corresponding switching element among the plurality of switching elements.

9. The power source system according to claim 1, wherein the plurality of switching elements includes
 a first switching element electrically connected between the power source line and a first node,
 a second switching element electrically connected between a second node and the first node,
 a third switching element electrically connected between the second node and a third node electrically connected to a negative electrode terminal of the second direct current power source, and
 a fourth switching element electrically connected between a negative electrode terminal of the first direct current power source and the third node, and wherein the power converter further includes
 a first reactor electrically connected between a positive electrode terminal of the first direct current power source and the second node, and
 a second reactor electrically connected between a positive electrode terminal of the second direct current power source and the first node.

10. A power source system comprising;
 a first direct current power source,
 a second direct current power source,
 a power converter comprising a boost chopper circuit, wherein the boost chopper circuit is configured to provide a bi-directional current boost and step-down, wherein the boost chopper circuit includes a plurality of switching elements for performing direct current power conversion between a power source line electrically connected to a load, and the first and the second direct current power sources, and
 a control device configured to control on-off of the plurality of switching elements,
 wherein the plurality of switching elements are disposed to be included in both of a first power conversion path formed between the first direct current power source and the power source line, and a second power conversion path formed between the second direct current power source and the power source line,
 wherein the power converter has a first operation mode for performing the direct current power conversion between the first and second direct current power sources and the power source line in parallel, wherein the control device is configured to generate control signals of on-off control signals of the plurality of switching elements to control outputs of the first and second direct current power sources by varying an on-off period of the plurality of switching elements in the first operation mode, and wherein the control signals are adjusted to achieve a phase of current so as to superimpose a rising timing or a falling timing of an electric current of the first direct current power source on a rising timing or a falling timing of an electric current of the second direct current power source.

11. The power source system according to claim 10, wherein the plurality of switching elements includes
a first switching element electrically connected between the power source line and a first node,
a second switching element electrically connected between a second node and the first node,
a third switching element electrically connected between a third node electrically connected to a negative electrode terminal of the second direct current power source and the second node, and
a fourth switching element electrically connected between a negative electrode terminal of the first direct current power source and the third node, and wherein the power converter further includes
a first reactor electrically connected between a positive electrode terminal of the first direct current power source and the second node, and
a second reactor electrically connected between a positive electrode terminal of the second direct current power source and the first node.

12. The power source system according to claim 11, wherein the control signals are adjusted to achieve a phase of current so as to superimpose a falling timing of an electric current of the first direct current power source on a rising timing of an electric current of the second direct current power source, when both of the first and second direct current power sources are in powering conditions.

13. The power source system according to claim 11, wherein the control signals are adjusted to achieve a phase of current so as to superimpose a rising timing of an electric current of the first direct current power source on a falling timing of an electric current of the second direct current power source, when both of the first and second direct current power sources are in regenerative conditions.

14. The power source system according to claim 11, wherein the control signals are adjusted to achieve a phase of current so as to superimpose a falling timing of an electric current of the first direct current power source on a falling timing of an electric current of the second direct current power source, when the first direct current power source is in regenerative condition while the second direct current power source is in powering condition.

15. The power source system according to claim 11, wherein the control signals are adjusted to achieve a phase of current so as to superimpose a rising timing of an electric current of the first direct current power source on a rising timing of an electric current of the second direct current power source, when the first direct current power source is in a powering condition while the second direct current power source is in a regenerative condition.

16. The power source system according to claim 11, wherein the power converter further includes a second operation mode for performing a direct current power conversion while the first and second direct current power sources are electrically connected to the power source line in series, wherein the control device is configured to adjust the control signal to achieve a phase of current so as to superimpose a rising timing of an electric current of the first direct current power source on a falling timing of an electric current of the second direct current power source, when both of the first and second direct current power sources are in powering conditions in the second operation mode.

17. The power source system according to claim 16, wherein the control device is configured to adjust the control signal to achieve a phase of current so as to superimpose a falling timing of an electric current of the first direct current power source on a rising timing of an electric current of the second direct current power source, when both of the first and second direct current power sources are in regenerative conditions in the second operation mode.

18. The power source system according to claim 10, wherein the control device is configured to adjust the phase of current by varying the phase difference between the first carrier signal used for a first pulse width modulation control to control an output of the first direct current power source and the second carrier signal used for a second pulse width modulation control to control an output of the second direct current power source.

* * * * *